United States Patent
Gellis

(10) Patent No.: US 10,420,382 B2
(45) Date of Patent: Sep. 24, 2019

(54) UTILITY GLOVE

(71) Applicant: MadGrip Holdings, LLC, Essex Junction, VT (US)

(72) Inventor: David Gellis, Stowe, VT (US)

(73) Assignee: MADGRIP HOLDINGS, LLC, Essex Junction, VT (US)

( * ) Notice: Subject to any disclaimer, the term of this patent is extended or adjusted under 35 U.S.C. 154(b) by 304 days.

(21) Appl. No.: 15/385,218

(22) Filed: Dec. 20, 2016

(65) Prior Publication Data

US 2017/0100858 A1     Apr. 13, 2017

Related U.S. Application Data

(60) Division of application No. 14/073,532, filed on Nov. 6, 2013, now Pat. No. 9,555,567, which is a
(Continued)

(51) Int. Cl.
*A41D 19/015*     (2006.01)
*B29C 45/14*      (2006.01)
(Continued)

(52) U.S. Cl.
CPC ... *A41D 19/01547* (2013.01); *A41D 19/0048* (2013.01); *A41D 19/015* (2013.01);
(Continued)

(58) Field of Classification Search
CPC .............. B29C 45/14008; B29C 45/14; A41D 19/1505; A41D 19/01523; A41D 19/01558; A41D 19/0065
See application file for complete search history.

(56) References Cited

U.S. PATENT DOCUMENTS 1,664,542 A     4/1928 Douglass
1,725,065 A *   8/1929 Edwards ............ A41D 19/0065
                                                2/168
(Continued)

FOREIGN PATENT DOCUMENTS

CA     994097     8/1976
CA     2637973    1/2009
(Continued)

OTHER PUBLICATIONS

Vibram Five Finger Classic, http://www.vibramfivefingers.comm/products/images/102/large.jpg, viewed Jul. 2007.
(Continued)

*Primary Examiner* — Matthew J Daniels
(74) *Attorney, Agent, or Firm* — Florek & Endres PLLC

(57) ABSTRACT

A utility glove formed of a glove blank of a fabric material in the shape of at least a portion of a hand having one or more areas of elastomeric material injection molded thereon to form one or more three dimensional molded portions, the three dimensional molded portions being the fabric material with the elastomeric material bonded thereto, wherein one or more three dimensional molded portions leave at least one area of fabric material of the glove blank without elastomeric material bonded to the fabric. The fabric material of the glove blank can be made from one or more fabrics, a treated fabric, a coated fabric or combinations thereof, or the fabric may have a portion with a coating on an area without elastomeric material.

18 Claims, 20 Drawing Sheets

Related U.S. Application Data continuation-in-part of application No. 13/500,483, filed as application No. PCT/US2010/052168 on Oct. 11, 2010, now Pat. No. 9,346,202, which is a continuation-in-part of application No. 12/577,273, filed on Oct. 12, 2009, now Pat. No. 9,498,009, which is a continuation-in-part of application No. 12/218,562, filed on Jul. 16, 2008, now abandoned.

(60) Provisional application No. 60/950,028, filed on Jul. 16, 2007.

(51) Int. Cl.
| | | |
|---|---|---|
| *A41D 19/00* | (2006.01) | |
| *A41D 19/04* | (2006.01) | |
| *A41D 31/102* | (2019.01) | |
| *A41D 31/12* | (2019.01) | |
| *B29C 41/14* | (2006.01) | |
| *B29C 41/20* | (2006.01) | |
| *B29C 41/22* | (2006.01) | |
| *B29L 31/48* | (2006.01) | |

(52) U.S. Cl.
CPC . *A41D 19/01505* (2013.01); *A41D 19/01529* (2013.01); *A41D 19/04* (2013.01); *A41D 31/102* (2019.02); *A41D 31/12* (2019.02); *B29C 45/1418* (2013.01); *B29C 45/14336* (2013.01); *A41D 2400/80* (2013.01); *A41D 2600/10* (2013.01); *A41D 2600/20* (2013.01); *B29C 41/14* (2013.01); *B29C 41/20* (2013.01); *B29C 41/22* (2013.01); *B29L 2031/4864* (2013.01)

(56) References Cited

U.S. PATENT DOCUMENTS

| | | |
|---|---|---|
| 1,979,130 A | 10/1934 | Wiley |
| 2,120,722 A | 6/1938 | Tillotson |
| 2,907,047 A | 10/1959 | Steinberg |
| 2,913,729 A | 11/1959 | Wisenburg |
| 3,035,291 A | 5/1962 | Bingham, Jr. |
| 3,324,220 A | 6/1967 | Goy |
| 3,383,782 A | 5/1968 | McGinnity |
| 3,663,679 A | 5/1972 | Barre et al. |
| 3,735,511 A | 5/1973 | Gilbert et al. |
| 3,869,726 A | 3/1975 | Bell |
| 3,877,101 A | 4/1975 | Lewis |
| 3,896,202 A | 7/1975 | Palau |
| 3,921,313 A | 11/1975 | Mahide et al. |
| 3,975,840 A | 8/1976 | Juzenko |
| 4,021,860 A | 5/1977 | Swallow et al. |
| 4,051,553 A | 10/1977 | Howard |
| 4,094,014 A | 6/1978 | Schroeder |
| D248,898 S | 8/1978 | DeLeone et al. |
| 4,134,955 A | 1/1979 | Hanrahan et al. |
| 4,150,455 A | 4/1979 | Fukuoka |
| 4,268,931 A | 5/1981 | Salomon |
| 4,294,022 A | 10/1981 | Stockli et al. |
| 4,295,238 A | 10/1981 | Clark |
| 4,333,192 A | 6/1982 | Stockli et al. |
| 4,359,783 A | 11/1982 | Andrews |
| 4,371,988 A | 2/1983 | Berend |
| D273,054 S | 3/1984 | Brinson, Jr. |
| 4,447,967 A | 5/1984 | Zaino |
| 4,453,904 A * | 6/1984 | Koliwer ............... B29C 33/12 12/128 C |
| 4,515,851 A | 5/1985 | Johnson |
| 4,651,354 A | 3/1987 | Petrey |
| 4,778,368 A | 10/1988 | Rebers |
| 4,785,479 A | 11/1988 | Watanabe |
| 4,921,672 A | 5/1990 | Bock |
| D321,426 S | 11/1991 | Brinker |
| 5,092,347 A | 3/1992 | Shaffer et al. |
| 5,093,067 A | 3/1992 | Gibson |
| 5,119,512 A | 6/1992 | Dunbar |
| D328,369 S | 7/1992 | Hong |
| 5,362,045 A | 11/1994 | Hammett et al. |
| 5,402,537 A | 4/1995 | Kolada |
| D372,112 S | 7/1996 | Garneau |
| 5,598,582 A | 2/1997 | Andrews et al. |
| 5,617,585 A | 4/1997 | Fons et al. |
| 5,640,714 A | 6/1997 | Tanaka |
| 5,640,720 A | 6/1997 | Sandbank |
| 5,675,839 A | 10/1997 | Gordon et al. |
| 5,788,332 A | 8/1998 | Hettinga |
| 6,044,493 A | 4/2000 | Post |
| 6,065,155 A | 5/2000 | Sandusky |
| 6,081,928 A | 7/2000 | Kolliwer |
| 6,128,778 A | 10/2000 | Castagneri |
| 6,185,747 B1 | 2/2001 | Hughes |
| 6,415,446 B1 | 7/2002 | McLean et al. |
| 6,427,246 B1 | 8/2002 | Doi et al. |
| D462,824 S | 9/2002 | Jones, Sr. |
| D468,074 S | 1/2003 | Votel |
| 6,526,593 B2 | 3/2003 | Sajovic |
| 6,578,205 B1 | 6/2003 | King |
| 6,618,860 B1 | 9/2003 | Sullivan et al. |
| 6,675,392 B2 | 1/2004 | Albert |
| 6,704,939 B2 | 3/2004 | Faulconer |
| 6,845,519 B2 | 1/2005 | Garneau |
| 6,889,389 B2 | 5/2005 | Kleinert |
| 6,928,658 B2 | 8/2005 | Taira et al. |
| 6,943,130 B2 | 9/2005 | Gabrielli |
| D514,771 S | 2/2006 | Jaeger |
| D514,772 S | 2/2006 | Bevier |
| D515,782 S | 2/2006 | Mattesky |
| 7,100,212 B2 | 9/2006 | Jaeger |
| D536,837 S | 2/2007 | Jaeger |
| 7,287,285 B2 | 10/2007 | Jaeger |
| 7,310,826 B2 | 12/2007 | Kishihara |
| D558,952 S | 1/2008 | Ash et al. |
| D579,181 S | 10/2008 | Swanson et al. |
| D581,102 S | 11/2008 | Faulconer |
| D582,134 S | 12/2008 | Von Conta et al. |
| D584,026 S | 1/2009 | Kleinert |
| 7,475,433 B2 | 1/2009 | Coulter et al. |
| D586,982 S | 2/2009 | Fliri |
| D589,679 S | 4/2009 | Rolfe |
| D608,978 S | 2/2010 | Votel |
| D618,882 S | 7/2010 | Jaeger |
| D621,552 S | 8/2010 | Fitzgerald et al. |
| D625,051 S | 10/2010 | Fitzgerald et al. |
| 7,805,860 B2 | 10/2010 | Fliri |
| D630,005 S | 1/2011 | Fliri |
| D645,212 S | 9/2011 | Gellis |
| D647,278 S | 10/2011 | Gellis |
| D648,919 S | 11/2011 | Gellis |
| D650,968 S | 12/2011 | Gellis |
| D657,500 S | 4/2012 | Gellis |
| 2001/0044950 A1 | 11/2001 | Sajovic |
| 2002/0010957 A1 | 1/2002 | Katz |
| 2003/0126666 A1 | 7/2003 | McNamara |
| 2004/0025226 A1 | 2/2004 | Jaeger |
| 2004/0025227 A1* | 2/2004 | Jaeger ............... A41D 19/01558 2/161.6 |
| 2005/0144703 A1 | 7/2005 | Hilbert |
| 2005/0160516 A1 | 7/2005 | Price |
| 2005/0268374 A1* | 12/2005 | Mattesky ......... A41D 19/01523 2/164 |
| 2006/0017195 A1 | 1/2006 | Yang |
| 2006/0143767 A1 | 7/2006 | Yang et al. |
| 2007/0083968 A1 | 4/2007 | Stokes |
| 2007/0083980 A1 | 4/2007 | Yang et al. |
| 2007/0144039 A1 | 7/2007 | Fliri |
| 2007/0204381 A1 | 9/2007 | Thompson et al. |
| 2007/0271819 A1 | 11/2007 | Chen |
| 2008/0060111 A1 | 3/2008 | Baacke et al. |
| 2008/0110291 A1 | 5/2008 | Vitek |
| 2008/0201823 A1 | 8/2008 | Jaeger |
| 2009/0038052 A1 | 2/2009 | Gellis |
| 2009/0044306 A1 | 2/2009 | Lamson et al. |

(56) References Cited

U.S. PATENT DOCUMENTS

| | | | |
|---|---|---|---|
| 2009/0139007 | A1 | 6/2009 | Bevier |
| 2009/0144881 | A1 | 6/2009 | Panosian et al. |
| 2009/0320178 | A1 | 12/2009 | Faulconer |
| 2010/0024095 | A1 | 2/2010 | Gellis |
| 2010/0083420 | A1 | 4/2010 | Bouckaert |
| 2011/0030121 | A1 | 2/2011 | Smalls |
| 2011/0258879 | A1 | 10/2011 | Dananberg et al. |
| 2012/0204321 | A1 | 8/2012 | Connelly et al. |
| 2012/0227158 | A1 | 9/2012 | Ashworth |
| 2012/0266359 | A1 | 10/2012 | Gellis |
| 2014/0059739 | A1 | 3/2014 | Gellis |

FOREIGN PATENT DOCUMENTS

| | | |
|---|---|---|
| CL | 200800807 | 3/2008 |
| CN | 1039349 A | 2/1990 |
| DE | 29515362 U1 | 1/1998 |
| EP | 0506218 | 1/1996 |
| JP | 58-005237 A | 1/1983 |
| JP | 61-205581 U | 12/1986 |
| JP | 64-68504 A | 3/1989 |
| JP | 4-131609 U1 | 12/1992 |
| JP | 11-350218 A | 12/1999 |
| JP | 2007084975 A | 4/2007 |
| JP | 3131685 U | 5/2007 |
| JP | 2008050745 A | 3/2008 |
| KR | 20110115206 A | 10/2011 |
| TW | 201138661 A | 11/2011 |
| WO | 1994014589 A1 | 7/1994 |
| WO | 1996039055 A1 | 12/1996 |
| WO | 1998051171 A1 | 11/1998 |
| WO | 2005053447 A1 | 6/2005 |
| WO | WO 2007038487 | 4/2007 |

OTHER PUBLICATIONS

Copenheaver, Blaine R. "International Search Report and Written Opinion of the International Search Authority, or the Declaration for International Application No. PCT/US2010/052168," dated Dec. 2, 2010.

Baharlou, Simin, "International Preliminary Report on Patentability, and Written Opinion of the International Searching Authority for International Patent Application No. PCT/US2010/052168," dated Apr. 17, 2012.

Copenheaver, Blaine R., "International Search Report and Written Opinion of the International Searching Authority for International Patent Application No. PCT/US2012/044355," dated Oct. 1, 2012.

Sasaki, Toshio, "Notification of Reasons for Rejection of Japanese Patent Application No. 2010-102027," Japan Patent Office, dated Jan. 7, 2014.

*MadGrip Holdings, LLC* v. *West Chester Holdings, Inc.*, Case No. 2:16-cv-00272-wks, "West Chester Holdings, Inc.'s Initial Invalidity Contentions," Mar. 3, 2017.

1999-2000 West Chester Catalog.

McDonald, Ted, "Barefoot Ted's Adventures: LA Marathon XX 2005," barefootted.com/2005/03/la-marathon-xx-2005.html, Mar. 6, 2005.

McDonald, Ted, "Barefoot Ted's Adventures: San Gabriel Mountains 50K (31 Miles)—Survived!!!," http://www.barefootted.com/index.php?q=/2005/04/san-gabriel-mountains-50k-31-miles.html, Apr. 16, 2015.

McDonald, Ted, "Barefoot Ted's Adventures: Palos Verdes Marathon—Finished in 3:31!," http://barefootted.com/2005/05/palos-verdes-marathon-finished-in-331.html, May 14, 2005.

McDonald, Ted, "Barefoot Ted's Adventures: Long Beach Marathon 2005," barefootted.com/2005/10/2005-long-beach-marathon.html, Oct. 16, 2005.

McDonald, Ted, "Barefoot Ted's Adventures: Santa Clarita Marathon—Boston Qualifier," http://barefootted.com/2005/11/santa-clarita-marathon-boston.html, Nov. 6, 2005.

Ogando, Joseph, "Injection molded gloves keep shocks at bay," DesignNews, Materials and Assembly, http://www.designnews.com/document.asp?doc_id=219533, Dec. 16, 2002, accessed Jul. 21, 2016.

*MadGrip Holdings, LLC* v. *West Chester Holdings, Inc.*, Case No. 2:16-cv-00272-wks, Invalidity Claim Chart—Baacke (U.S. Appl. No. 11/780,587).

*MadGrip Holdings, LLC* v. *West Chester Holdings, Inc.*, Case No. 2:16-cv-00272-wks, "Invalidity Claim Chart—Chase (U.S. Pat. No. 5,632,045)".

*MadGrip Holdings, LLC* v. *West Chester Holdings, Inc.*, Case No. 2:16-cv-00272-wks, "Invalidity Claim Chart—Edwards (U.S. Pat. No. 1,725,065)".

*MadGrip Holdings, LLC* v. *West Chester Holdings, Inc.*, Case No. 2:16-cv-00272-wks, "Invalidity Claim Chart—Gibson (U.S. Pat. No. 5,093,067)".

*MadGrip Holdings, LLC* v. *West Chester Holdings, Inc.*, Case No. 2:16-cv-00272-wks, "Invalidity Claim Chart—Goy (U.S. Pat. No. 3,324,220)".

*MadGrip Holdings, LLC* v. *West Chester Holdings, Inc.*, Case No. 2:16-cv-00272-wks, "Invalidity Claim Chart—Johnson (U.S. Pat. No. 4,515,851)".

*MadGrip Holdings, LLC* v. *West Chester Holdings, Inc.*, Case No. 2:16-cv-00272-wks, "Invalidity Claim Chart—Juzenko (U.S. Pat. No. 3,975,840)".

*MadGrip Holdings, LLC* v. *West Chester Holdings, Inc.*, Case No. 2:16-cv-00272-wks, "Invalidity Claim Chart—Katz (U.S. Publication No. 2002/0010957)".

*MadGrip Holdings, LLC* v. *West Chester Holdings, Inc.*, Case No. 2:16-cv-00272-wks, "Invalidity Claim Chart—Koliwer (U.S. Pat. No. 4,453,904)".

*MadGrip Holdings, LLC* v. *West Chester Holdings, Inc.*, Case No. 2:16-cv-00272-wks, "Invalidity Claim Chart—Lamson (U.S. Publication No. 2009/0044306)".

*MadGrip Holdings, LLC* v. *West Chester Holdings, Inc.*, Case No. 2:16-cv-00272-wks, "Invalidity Claim Chart—Mahide (U.S. Pat. No. 3,921,313)".

*MadGrip Holdings, LLC* v. *West Chester Holdings, Inc.*, Case No. 2:16-cv-00272-wks, "Invalidity Claim Chart—Masaaki (JP Publication No. 11-350218A)".

*MadGrip Holdings, LLC* v. *West Chester Holdings, Inc.*, Case No. 2:16-cv-00272-wks, "Invalidity Claim Chart—Schroder (U.S. Pat. No. 4,094,014)".

*MadGrip Holdings, LLC* v. *West Chester Holdings, Inc.*, Case No. 2:16-cv-00272-wks, "Invalidity Claim Chart—Stokes (U.S. Appl. No. 11/422,130)".

*MadGrip Holdings, LLC* v. *West Chester Holdings, Inc.*, Case No. 2:16-cv-00272-wks, "Invalidity Claim Chart—Vibram FiveFingers".

*MadGrip Holdings, LLC* v. *West Chester Holdings, Inc.*, Case No. 2:16-cv-00272-wks, "Invalidity Claim Chart—Wiley (U.S. Pat. No. 1,979,130)".

*MadGrip Holdings, LLC* v. *West Chester Holdings, Inc.*, Case No. 2:16-cv-00272-wks, "West Chester Holdings, Inc. Answer to First Amended Complaint and Counterclaim (and Exhibits 31.1-31.6)," Mar. 10, 2017.

*MadGrip Holdings, LLC* v. *West Chester Holdings, Inc.*, Case No. 2:16-cv-00272-wks, "Plaintiff MadGrip Holdings, LLC Answer to West CHester Holdings, Inc.'s Amended Counterclaims," Mar. 28, 2017.

\* cited by examiner

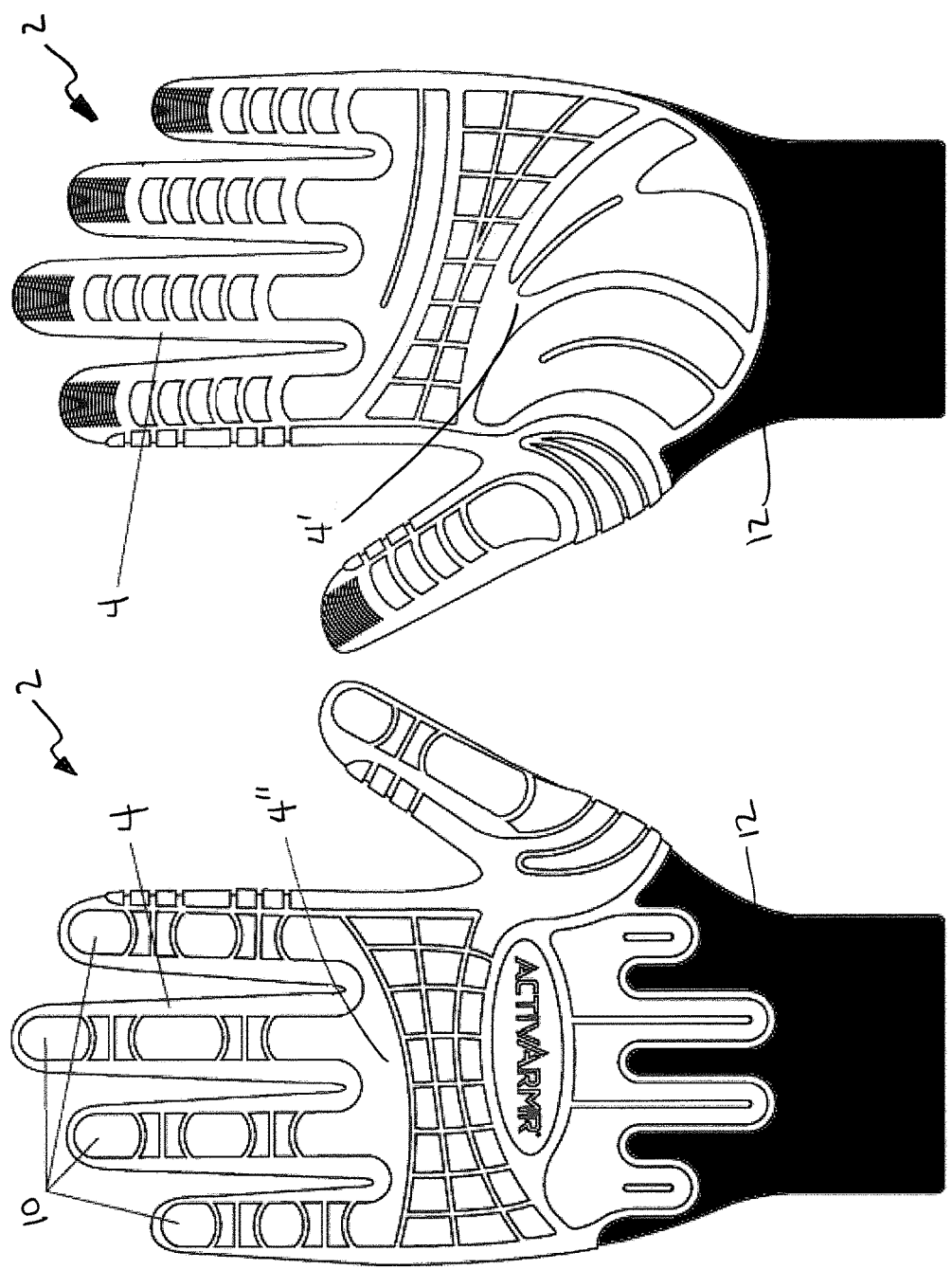

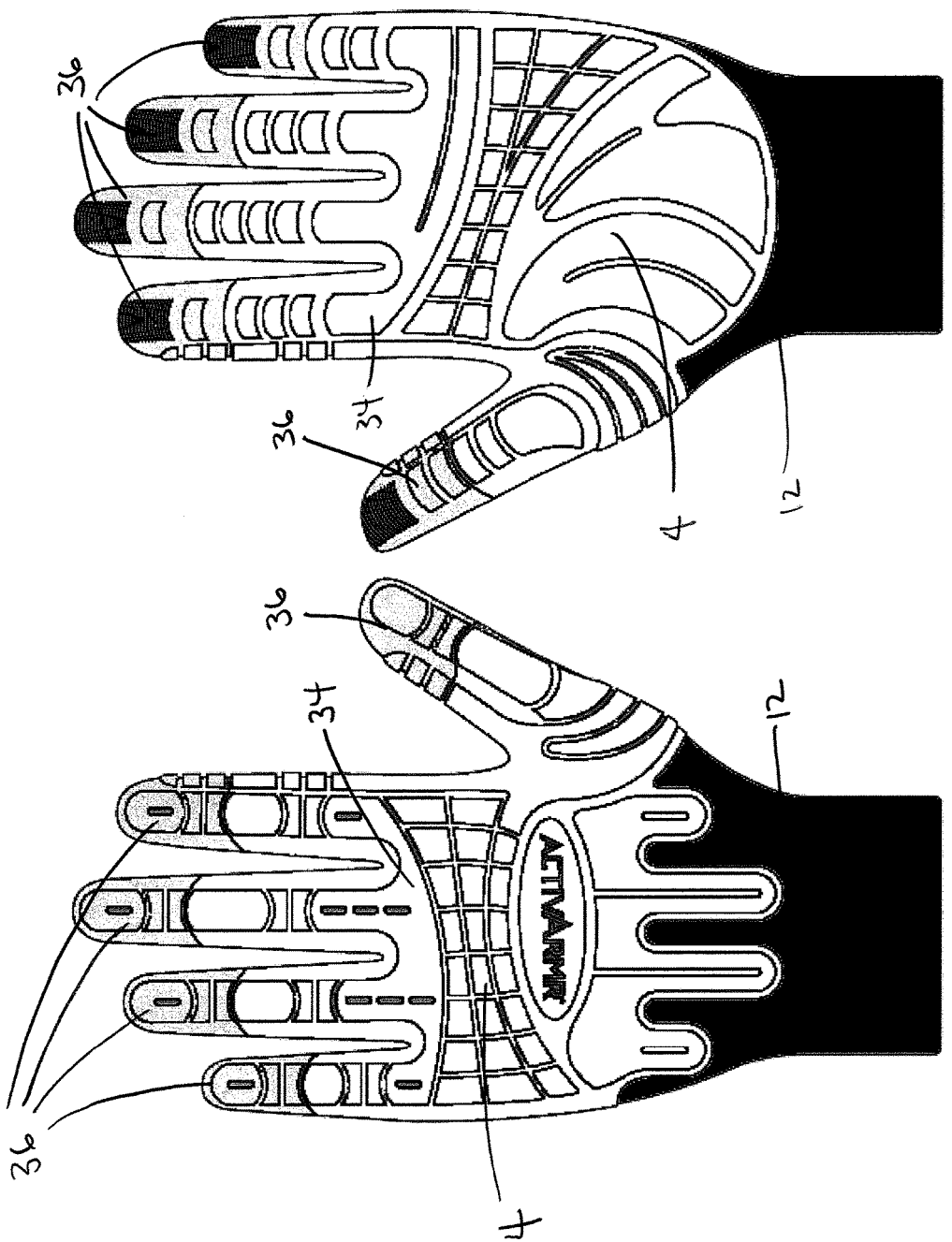

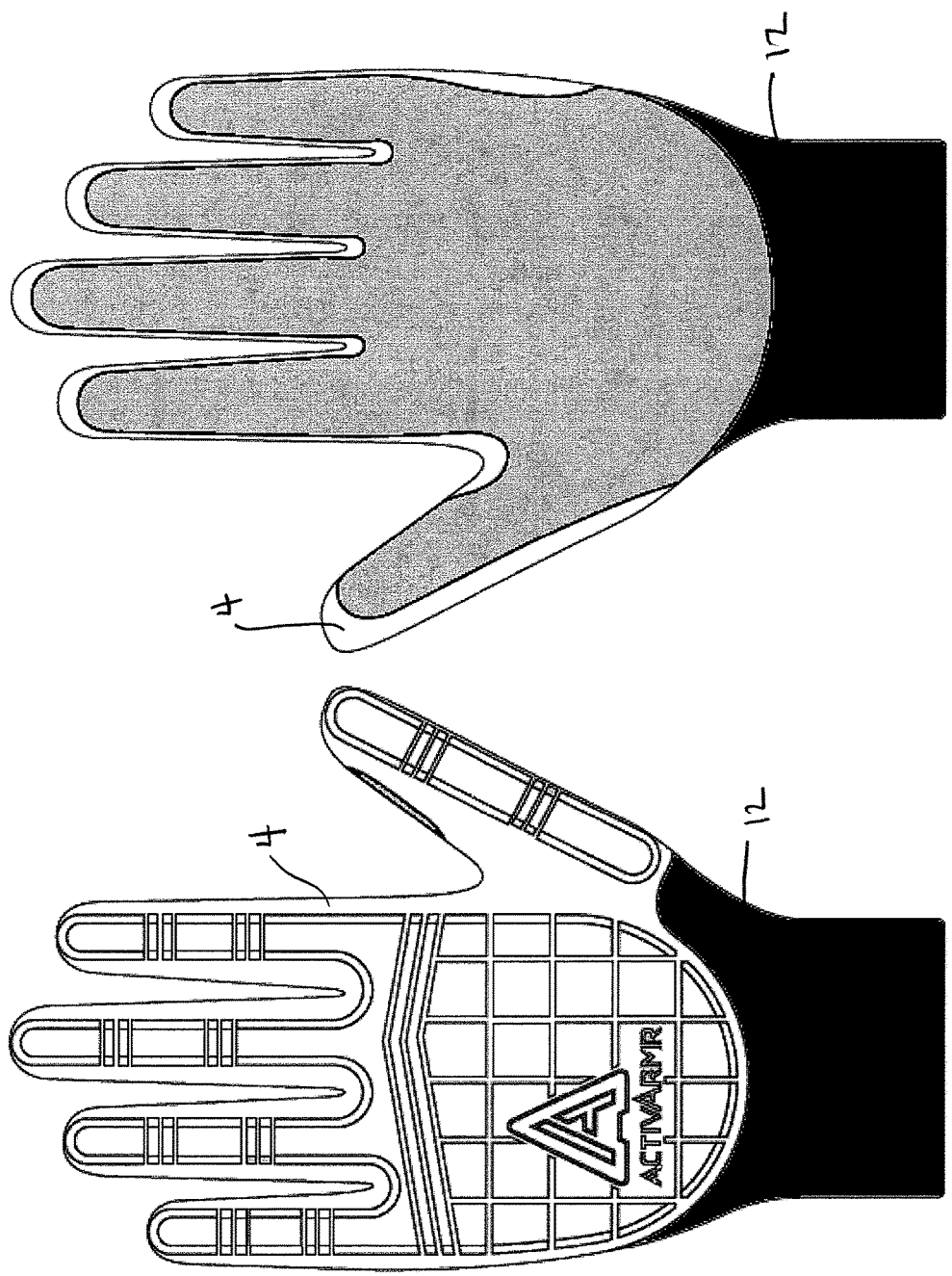

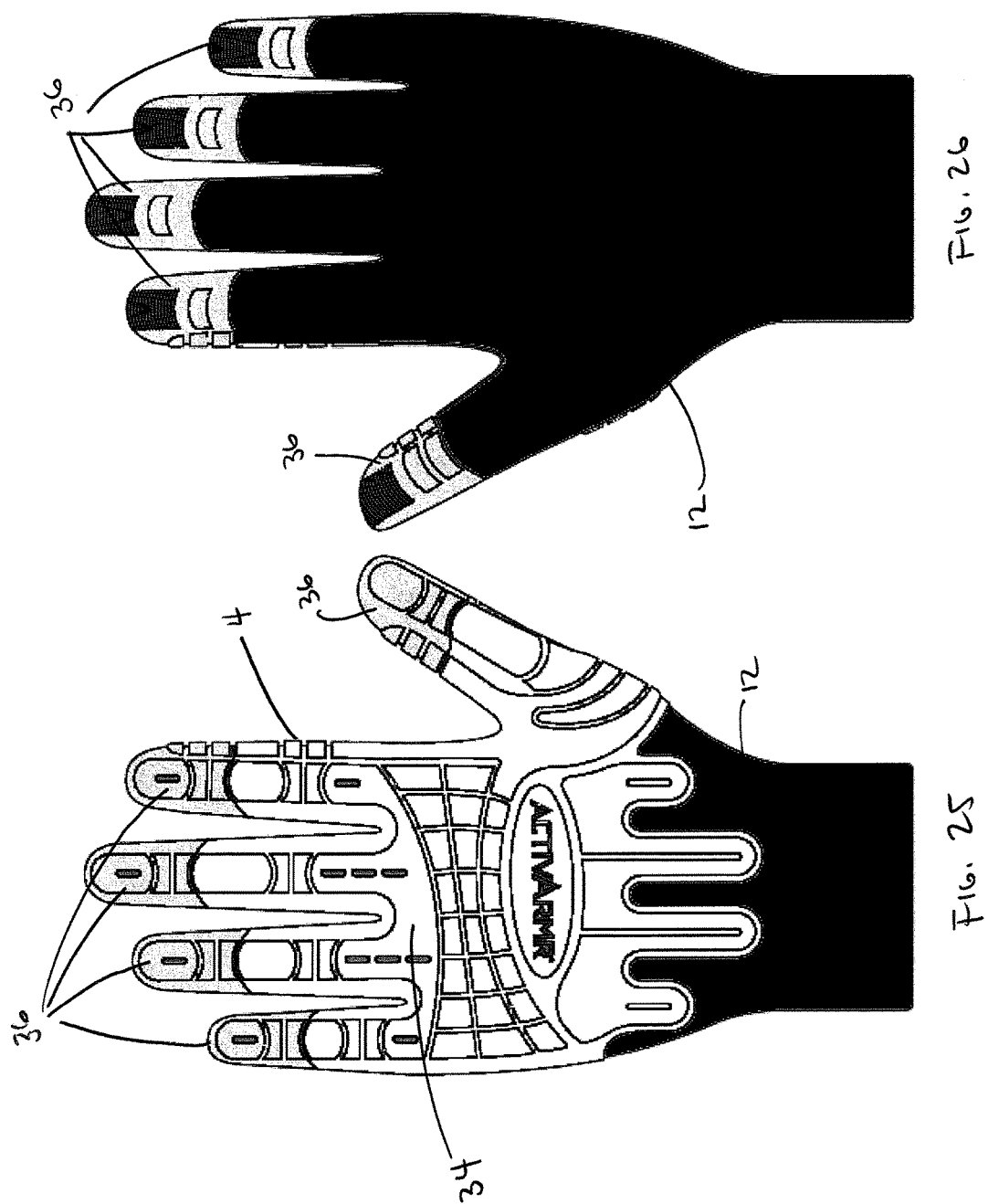

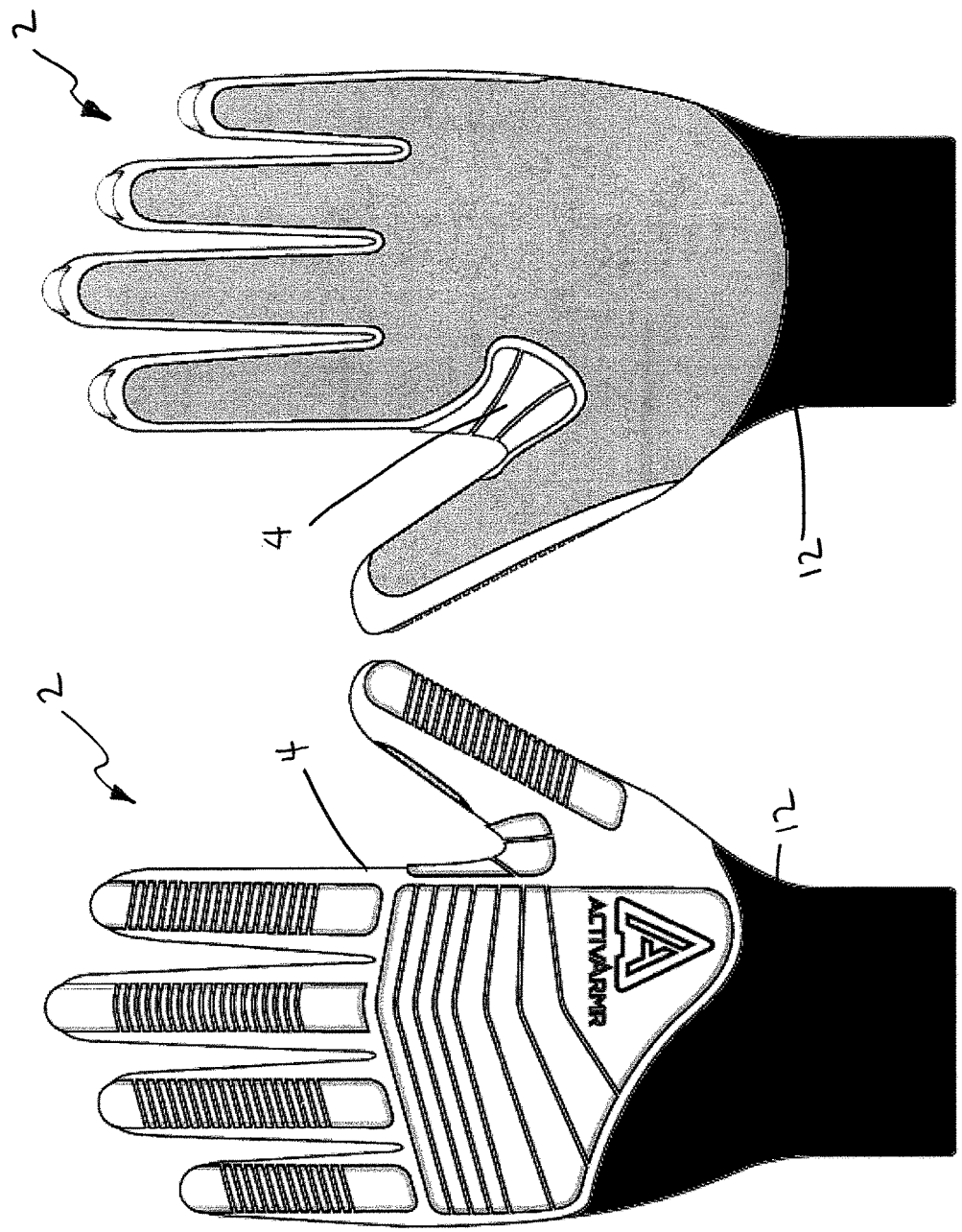

UTILITY GLOVE

REFERENCE TO RELATED APPLICATIONS

This application is a continuation in part of U.S. patent application Ser. No. 13/500,483 filed on Jun. 25, 2012, which is the National Phase filing of PCT/US2010/052168 filed on Oct. 11, 2010, which is based on U.S. patent application Ser. No. 12/577,273 filed on Oct. 12, 2009, which is a continuation in part of U.S. patent application Ser. No. 12/218,562 filed on Jul. 16, 2008, which claims priority to U.S. Provisional Patent Application No. 60/950,028 filed on Jul. 16, 2007. Each is incorporated by reference in its entirety.

FIELD OF THE INVENTION

The present invention relates to the field of utility gloves, for work, sports and athletics, gardening and the like and, more particularly, to utility gloves having elastomeric reinforcements for improved protection of the wearers' hands.

BACKGROUND OF THE INVENTION

Utility gloves are used in areas such as gardening, construction, industry, automotive, mining, oil and gas or general work at a job site, an industrial, production, or garden facility, sports or athletics or simply working or playing around one's home. These gloves usually contain a gripping portion that prevents items from slipping out of the user's hand, prevent injury to the user's skin such as cuts, scrapes and blisters, and provide a better grip when turning or grabbing objects. The gripping portion of the glove is usually applied to a knit nylon glove by dipping the nylon glove into an elastomeric material, such as natural or synthetic rubber, to apply an elastomeric gripping surface to the glove. This process increases the density of the glove and maintains a fabric portion which tends to absorb moisture and dirt and is hard to clean.

The purpose of the present invention is to create a utility glove with a seamless reinforcement in one or more zones most subject to abrasion. In addition to minimizing the seams, additional material or padding is provided in areas most subject to abrasion and/or impact, and this padding is preferably included without seams as well. In this regard, depending on the end usage envisioned, it is possible to adjust the amount of elastomeric material, including a natural or synthetic rubber, used in strategic areas to protect against impact and abrasion. Ultimately, the use of such padding provides the end user with a longer lasting, more comfortable glove. Additionally, the present invention includes the ability to provide different textures in the elastomeric material at strategic areas, to further provide one or more enhanced gripping surfaces.

SUMMARY OF THE INVENTION

It is therefore an object of the invention is to create a utility glove that is an improvement over typical dipped nylon knit utility gloves.

Another object of the invention is to provide additional durability and an ability to have varying palm thicknesses without having to increase the density of the knit utility glove.

A further object of the invention is to remove the reliance on fabric absorption of the elastomeric material to create density.

A still further object of the invention is to provide utility gloves with strategically placed padding and/or abrasion resistance zones as well as enhanced grip zones.

Yet a further object of the invention is to provide palm construction including an elastomeric material optionally without a knit backing, which typically absorbs excessive amounts of moisture and dirt. This allows for easier cleaning of the glove by simply being able to clean it off with a damp cloth as opposed to being laundered.

Another object of the invention is to create the maximum protection against abrasion in what typically are areas that require reinforcement, i.e., the index finger and thumb, as well as possibly the area between the index finger and thumb and the area directly below the base and crotch of each finger.

Still a further object of the invention is to provide abrasion and impact protection by raising the elastomeric material in the areas that are most likely to be subject to abrasion and impact, namely, the base of the thumb and the area of the palm directly below the fingers.

Another object of the invention is to create a molded component that can be altered to have varying elastomeric materials in different areas to provide for improved characteristics of the glove, and most particularly grip and flexibility. For example, softer elastomeric materials can be used for flexibility in areas less prone to wear and stronger, textured elastomeric materials can be used on in areas related to grip.

A further objective of the invention is to create a more natural feeling molded glove having a pre-curved concave palm portion, where the middle of the palm portion is set in from the edges of the palm portion to create an at least partially cupped shape, to minimize bunching when the wearer's hand closes. This pre-curved palm portion may also continue or extend to the fingers for a more natural shape of the hand at rest.

Still other objects and advantages of the invention will, in part, be obvious and/or apparent from the specification without deviating from the spirit and scope of the invention.

These and other objects are obtained through the utility glove of the present invention having at least one three dimensional molded portion formed of an elastomeric material molded onto a fabric material.

For the purposes of this disclosure, as apparent to one skilled in the art, the use of the phrase "three dimensional" when referring to a molded portion does not mean that the molded portion is formed on a flat plane, merely having different thicknesses or protrusions. Instead, as used here when referring to a molded portion, "three dimensional" means that the molded portion wraps around a portion of the glove, such as over a tip of the finger, around the front or back of a finger, around the side of a hand, over the saddle between the thumb and forefinger, etc., in a three dimensional configuration. Therefore, the three dimensional characteristic is not merely a bending or flexing of a two dimensional material but the formation of the molded portion into a three dimensional shape by injection molding the elastomeric material onto the fabric material in a three dimensional configuration.

The molded portion may have one or more of thickened areas for abrasion resistance, padded areas for comfort, flex grooves including thinned areas for improved movement, and textured grip areas for improved grip. The molded palm portion may be formed of different elastomeric materials to take advantage of the different characteristics of the particular materials. Preferably, the different elastomeric materials are integrally formed on the fabric material to create a unitary molded portion having different materials in different areas on the fabric material which cannot be separated without destroying the molded portion. Notwithstanding, the present invention contemplates the availability of different molded portions in different areas of the glove.

It is also contemplated that a molded portion may additionally or alternatively be formed on back side of the glove, so as to form a guard over the user's knuckles or back of the hand that may be vulnerable to injury in some uses. The molded back may be independent from or formed integrally with a molded portion that is on a front side of the glove, and may be formed so that the molded portion extends up to and including 360° about the wearer's hand, preferably without a seam.

A molded portion of a utility glove may be formed by placing a piece of heat resistant fabric against a first mold part formed in the shape of at least a portion of a hand, bringing a corresponding second mold part or parts having one or more cavities for accepting the elastomeric material into molding relation with the first mold part and injecting an elastomeric material into the mold cavity between the mold parts on the side of the fabric material opposite the first mold part to form the molded portion. When calling for a first mold part in the shape of at least a portion of the hand, it is meant that the mold part is formed in the three dimensional shape of at least a portion of the hand.

It is anticipated that the first mold part in the shape of at least a portion of the hand is formed in different sizes, relative to the glove sizes of the potential users, and that the corresponding second and/or additional mold part or parts include one or more of one or more textured areas, one or more thickened areas, one or more padded areas and one or more flex grooves. Preferably, the heat resistant fabric used in the mold is a knit hydrophilic material to improve absorbance of the elastomeric material, and most preferably a fabric material made of a spun yarn, which have hair like surfaces. Notwithstanding, the fabric onto which the elastomeric material is injection molded can be any suitable fabric, including fabrics formed of the same or different materials, treated fabrics, coated fabrics, etc. For example, a fabric glove with a nitrile coating can be used as the fabric to form the glove of the present invention, where the elastomeric material is molded over least a portion of the nitrile coated fabric.

Most preferably, the fabric placed on the mold in the shape of at least a portion of the hand is in the form of a glove that is placed over the first mold part in the three dimensional shape of at least a portion of the hand. This contemplates that the fabric corresponds to at least a portion of a glove, such that the fabric is not a swatch of fabric but rather comprises at least a portion with two layers of fabric when placed flat. When the fabric in the form of a glove is placed on the first mold part, the first mold part is inserted into an opening in the fabric formed as at least a portion of a glove with at least one layer on each side of at least a portion of the first mold part.

The elastomeric material used to form at least a portion of the three dimensional molded portion is preferably a relatively soft thermoplastic rubber material, which is generally measured by its shore A durometer, with a durometer of from about 10-25 and most preferably a durometer of about 15. On the other hand, higher shore A durometer material may be used when protection is desired over flexibility. In such instances, elastomeric material having durometer values of from about 15 to about 60 may be used. Notwithstanding, depending on the application, an elastomeric material having a shore A durometer from about 10 to about 60 may be used for the molded portion or any part or parts thereof.

When injection molded into a mold cavity in which the fabric resides, the elastomeric material is preferably absorbed into the porous structure of the fabric. In such instances where the fabric is not able to absorb the elastomeric material, i.e., due to the nature of the fabric or a particular coating in an area, etc., an adhesive may be used in that area where the elastomeric material is to be molded over such a portion of the fabric or the elastomeric material may be specifically selected to cooperate with the fabric and/or coating on the fabric to ensure adhesion of the elastomeric material to the fabric and/or coating on fabric. Alternatively, the fabric material, or coating, may be matched to the elastomeric material being injection molded onto it to create a chemical bond between the fabric and/or coating on the fabric and the elastomeric material being injection molded thereon.

It is also preferred that the thickness of the elastomeric material be controlled, with the thickness of the elastomeric material on the fabric being between from about 0.5 to about 3.0 mm. In this regard, it is preferred that the thickness in the areas intending to flex, i.e., at joints in the fingers and folds in the palm, be thinned or reduced relative to adjacent areas to create flexibility, even when areas prone to abrasion or in need of cushioning are thicker. The use of such a thin layer of elastomeric material is capable of use only due to the absorption of the elastomeric material into the porous fabric, with the selection of cooperating materials or with the help of an appropriate adhesive, which maintains the physical integrity of the thin elastomeric material.

Of course, other steps can be employed to create a finished glove, based on the manufacturer's design preference. For example, known process steps such as dipping a glove in a material to provide certain attributes may be used either before or after the molded palm portion is bonded to the fabric material.

BRIEF DESCRIPTION OF THE DRAWINGS

The present invention will be better understood when considered in view of the attached drawings, in which like reference characters indicate like parts. The drawings, however, are presented merely to illustrate the preferred embodiment of the invention without limiting the invention in any manner whatsoever.

FIG. 15 shows a back elevation of another alternative embodiment of the utility glove without openings in the elastomeric material.

FIG. 16 shows a front elevation of the alternative embodiment of the utility glove of FIG. 15.

FIG. 17 shows a back elevation of another alternative embodiment of the utility glove using an elastomeric material at the fingertips which is different than the elastomeric material used for the remainder of the molded portion.

FIG. 18 shows a front elevation of the alternative embodiment of the utility glove of FIG. 17.

FIGS. 21 and 23 show back elevations of alternative embodiments of the utility glove where the molded portion selectively covers areas of the glove, leaving other areas open for exposure of fabric or other treatments to the fabric.

FIGS. 22 and 24 show front elevations of the alternative embodiments of the utility glove of FIGS. 21 and 23, respectively.

FIG. 25 shows a back elevation of another alternative embodiment of the utility glove where the molded portion selectively covers areas of the glove, leaving other areas open for exposure of fabric or other treatments to the fabric, and including use of an elastomeric material at the fingertips which is different than the elastomeric material used for the remainder of the molded portion.

FIG. 26 shows a front elevation of the alternative embodiment of the utility glove of FIG. 25.

FIG. 29 shows a back elevation of an alternative embodiment of the utility glove where the molded portion covers the entire back of the glove and leaves areas of the front of the glove open for treatments to the fabric such as an elastomeric material coating.

FIG. 30 shows a front elevation of the alternative embodiment of the utility glove of FIG. 29, with the molded portion wrapping onto the glove front.

DETAILED DESCRIPTION OF THE PREFERRED EMBODIMENTS

The present invention is directed to a utility glove having one or more three dimensional molded portions comprising elastomeric material formed over fabric material and methods of making such utility gloves using injection molding to place the elastomeric material on the fabric material. The molded portions are intended to provide protection to the hand while conforming closely to the hand and not unduly limiting movement. The following preferred embodiments described are not intended to limit the invention in any manner whatsoever.

Figure 1:
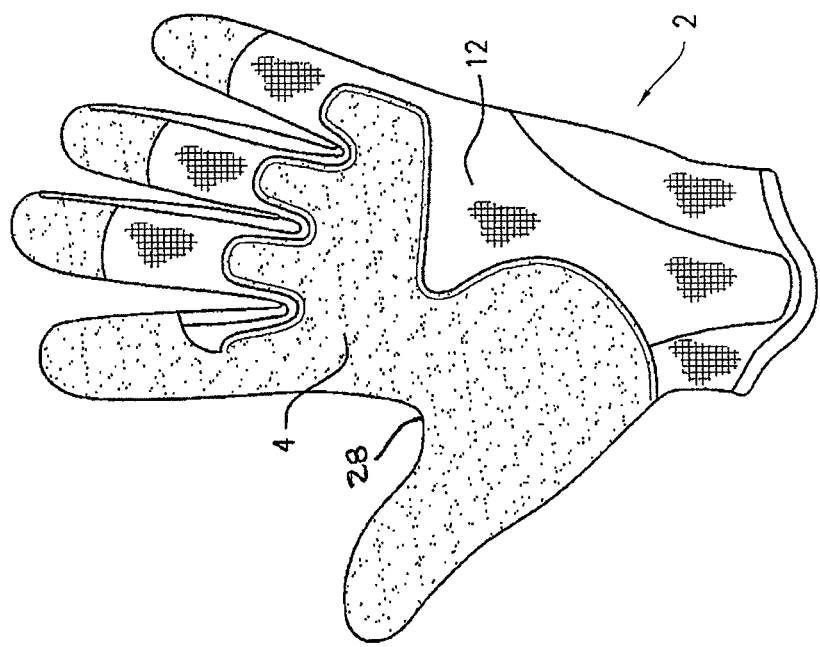
FIG. 1 shows a front view, palm side, of a utility glove according to the invention.

Starting with FIG. 1, the drawing shows the palm side of a utility glove 2 with a molded portion 4 formed of an elastomeric material bonded to a fabric material. The palm side of the utility glove 2 shown in FIG. 1 also includes a fabric material 12 in the area beyond the molded portion 4, although such a fabric material 12 is not required as a visible element of the palm side of the glove 2 of the present invention. Notwithstanding, it is preferred that the fabric material 12 beyond the molded portion 4 is the continuation of the fabric material forming the adjacent molded portion 4.

Figure 2:
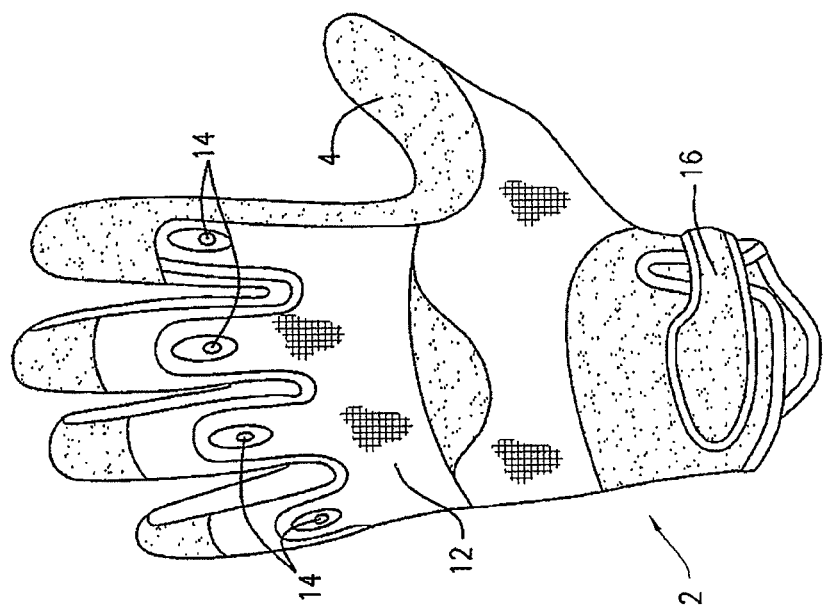
FIG. 2 shows a back view of the glove of FIG. 1.

FIG. 2 shows the back side of the glove 2, including a fabric material 12 and having independent molded areas 14 applied with raised perforated protective shapes. Of course, any molded portion can be formed on the back side of the glove 2, including a molded portion 4 or 14 that covers the knuckles where the fingers join the back of the hand or even the back of the hand itself. The fabric material 12 on the back side of the glove 2 is preferably formed as part of a glove blank including the fabric material 12 on the palm side of the glove. Alternatively, the fabric 12 on the back side of the glove 2 may be sewn to the palm side of the glove 2, either to the molded palm portion 4 or the fabric material 12 of the palm side. A closure element, shown as a molded wrist strap 16, may be provided to afford a better fit and help keep the glove 2 securely on the user's hand while in use.

Figure 4:
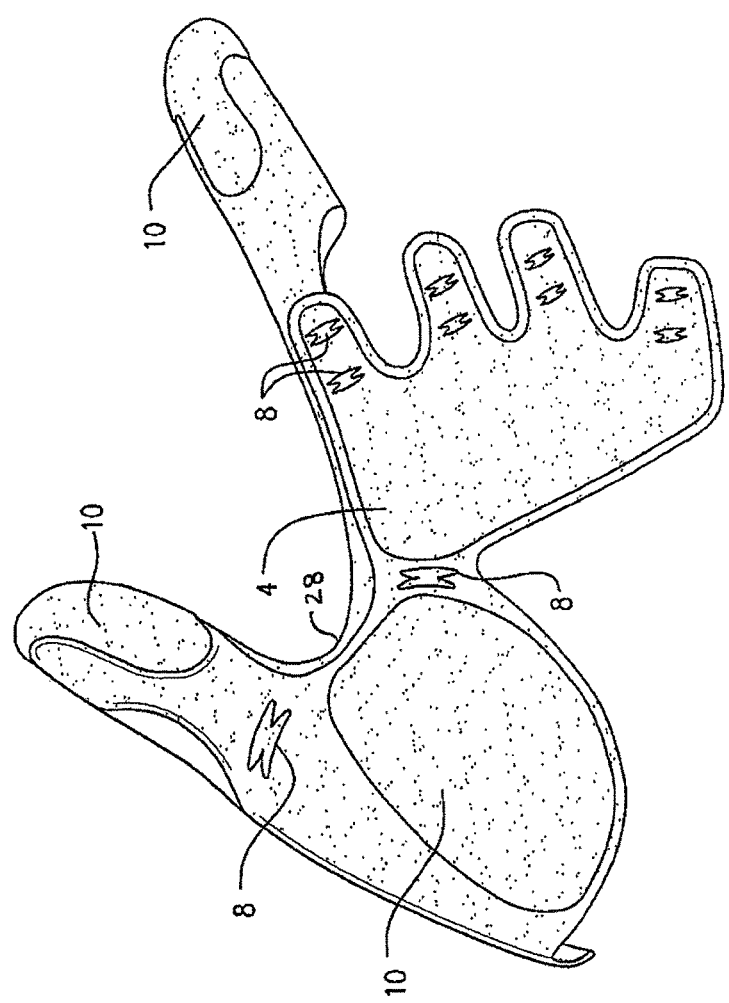
FIG. 4 shows the palm side of the palm gripping portion of the glove of FIG. 1 with embossed grip details.
Figure 6:
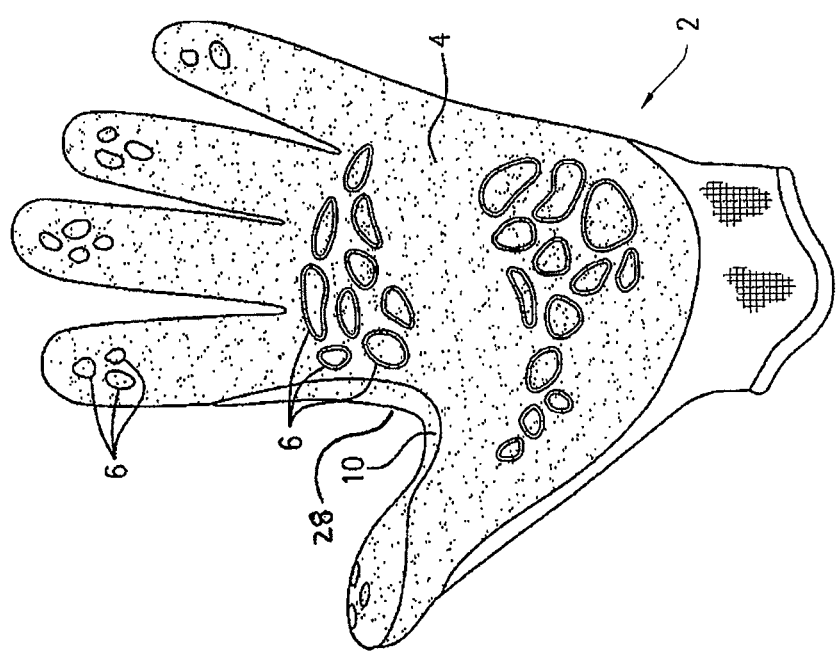
FIG. 6 shows the palm side of glove with the gripping portions of FIG. 5.
Figure 8:
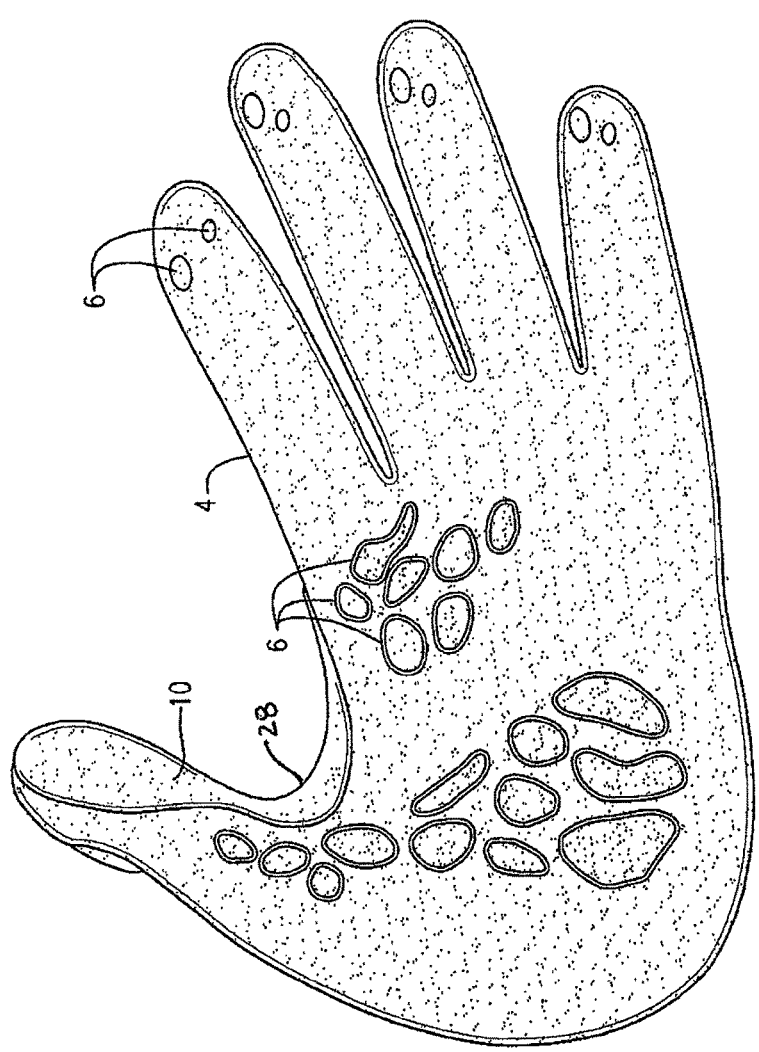
FIG. 8 shows the palm side of the palm gripping portion of FIG. 5.
Figure 9:
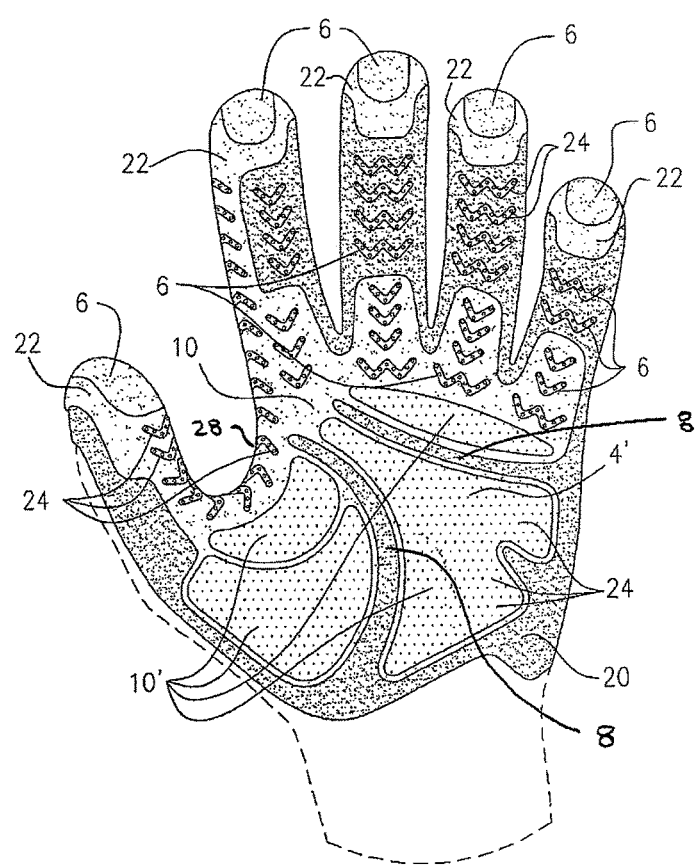
FIG. 9 shows a front view, palm side, of a preferred embodiment of a utility glove according to the invention.
Figure 10:
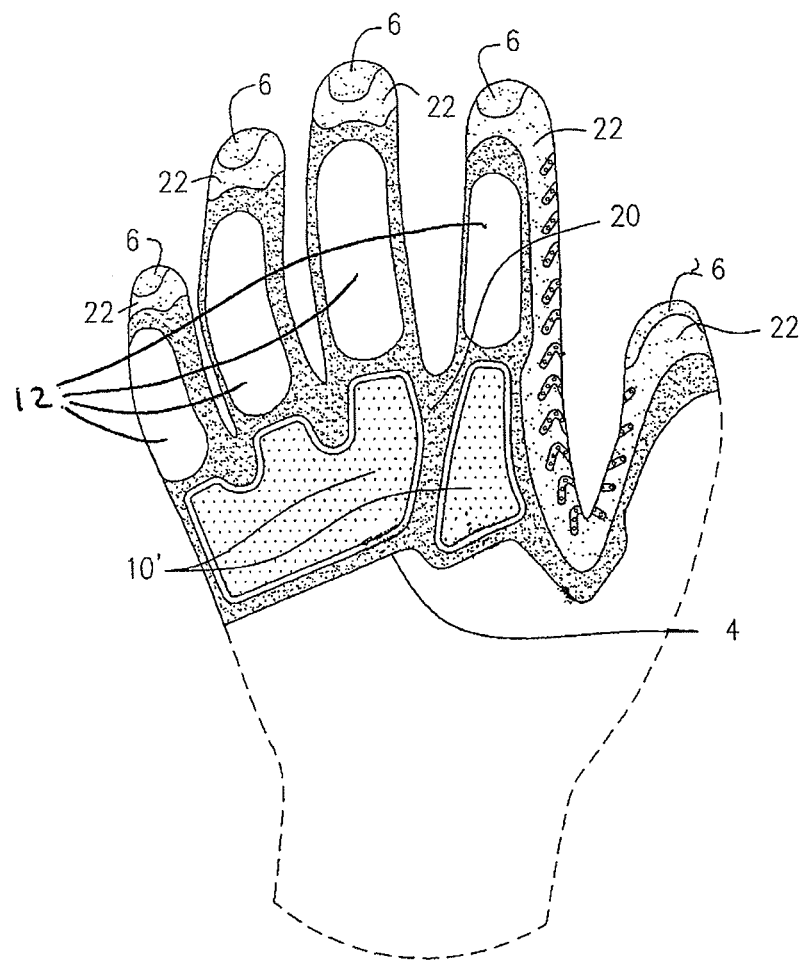
FIG. 10 shows a back view of the glove of FIG. 9.

The molded portion 4 of the glove 2 of the present invention preferably has embossed gripping details 6, as shown in FIGS. 6, 8 and 9, debossed flex grooves 8, shown in FIGS. 4 and 9, and raised textured grip areas 10, shown in FIGS. 4, 6 and 10. In this regard, the molded portion 4 of the utility glove of the present invention preferably includes raised textured grip areas 10 shown as a raised or thickened textured index finger tip and thumb tip for better gripping, durability and reinforcement.

Although any suitable fabric can be used, the molded portion 4 of the glove 2, or any molded portion 4 and/or 14 of the glove 2, is preferably manufactured by using a heat resistant knit hydrophilic fabric from a spun yarn that can withstand heat of approximately 400 degrees Fahrenheit onto which an elastomeric material is injection molded. The particular fabric may not be of essence to the invention, and all fabrics to which the elastomeric material can be bonded, directly or through use of an adhesive, are contemplated for use with the invention. More particularly, fabrics of different materials, coated fabrics, reinforced fabrics, etc., may be used to form the molded portion of the utility glove described here, including fabrics with particular characteristics such as but not limited to cut resistance, wear resistance, moisture wicking, etc. Moreover, if lower heat injection molding processes are presented, lower temperature resistant fabrics can be used.

When a knit hydrophilic fabric is used it has been found that fabric material comprising a spun nylon yarn material is the most suitable for the invention as presently contemplated. Such a nylon knit hydrophilic material comprises a porous structure as well as hair like extensions from the surface of the fibers for the elastomeric material to bond with the fabric 12 by penetrating and being drawn into the "pores" of the fabric 12 and by attaching to the surfaces of the hair like extensions. If the fabric 12 does not have such features for bonding to the elastomeric material during injection molding, or if it is a coated fabric where the pores and/or hair like extensions have been covered, it is preferred that the portion of the fabric 12 onto which the elastomeric material is to be bonded have an adhesive applied prior to injection molding the elastomeric material onto the fabric 12 or that the material of the fabric and/or coating and the elastomeric material be specifically selected to cooperate with each other to create a chemical bond or to otherwise ensure proper bonding between the fabric and/or coating and the elastomeric material.

Figure 3:
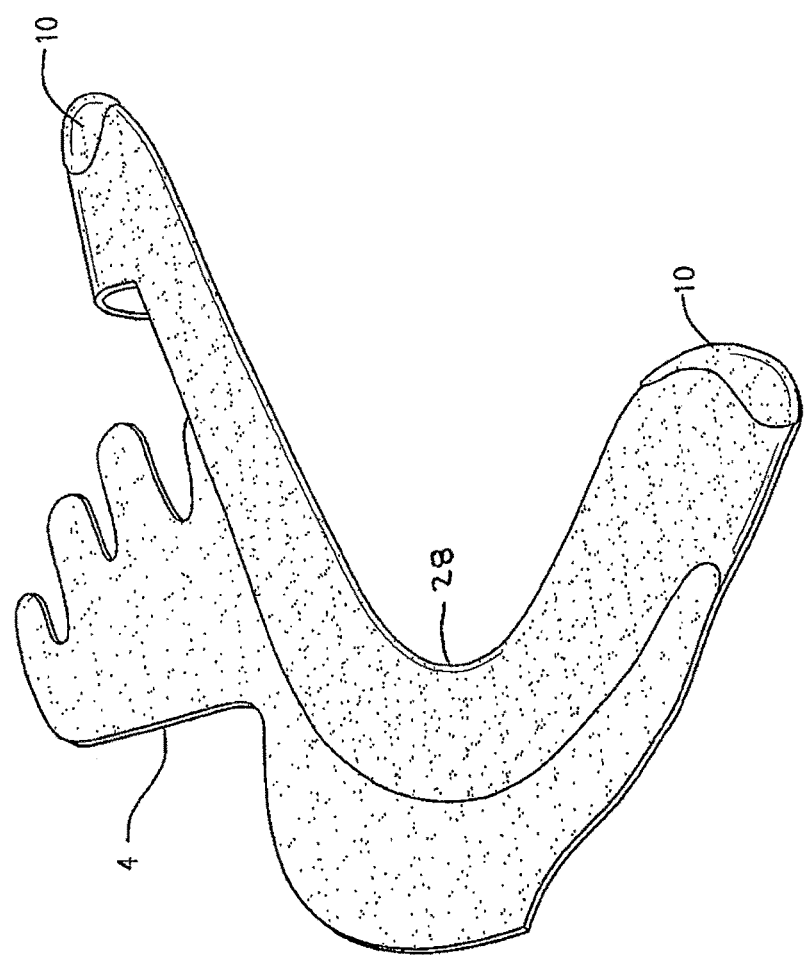
FIG. 3 shows the back of the palm side gripping portion of the glove of FIG. 1.
Figure 5:
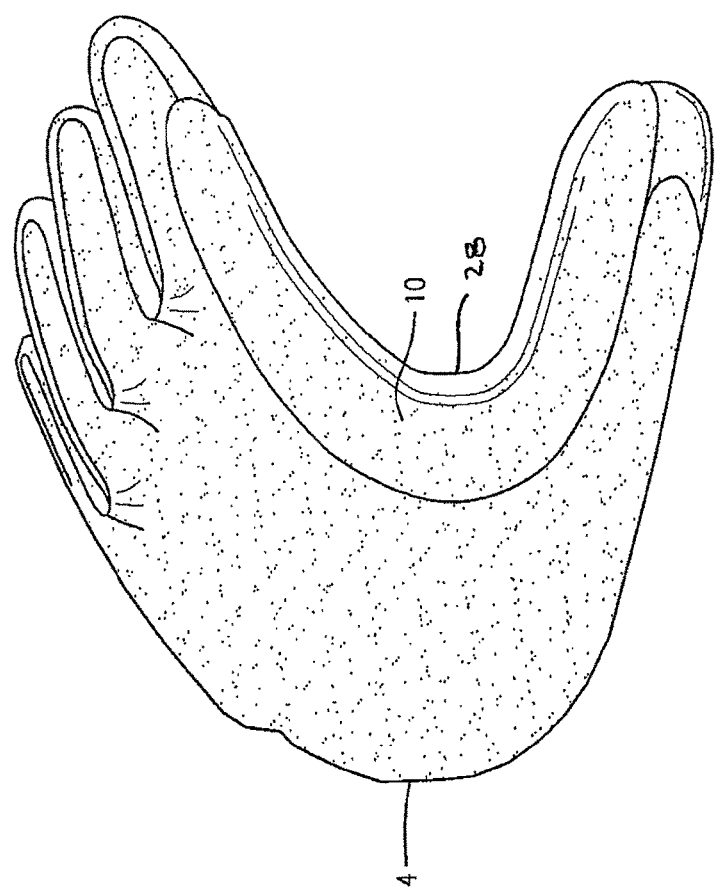
FIG. 5 shows the inside of the palm gripping portion of one glove embodiment.
Figure 7:
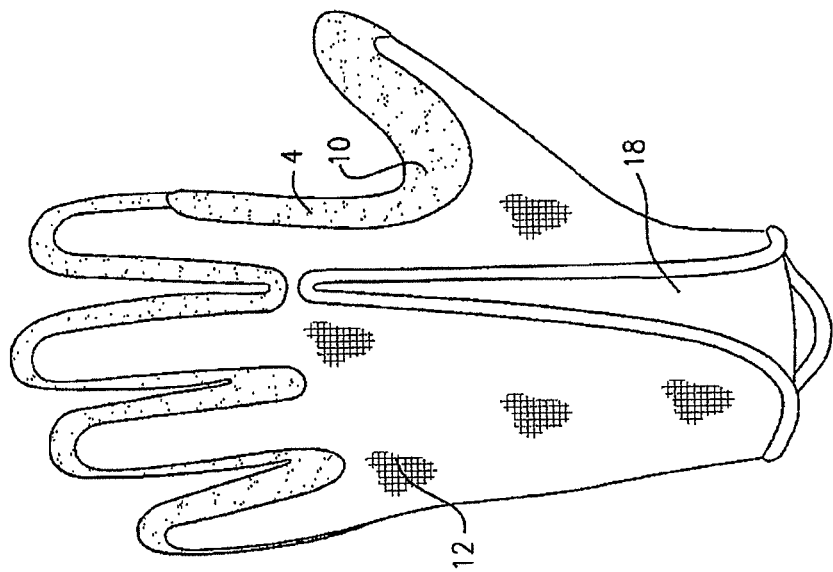
FIG. 7 shows the back side of the glove of FIG. 6.
Figure 11:
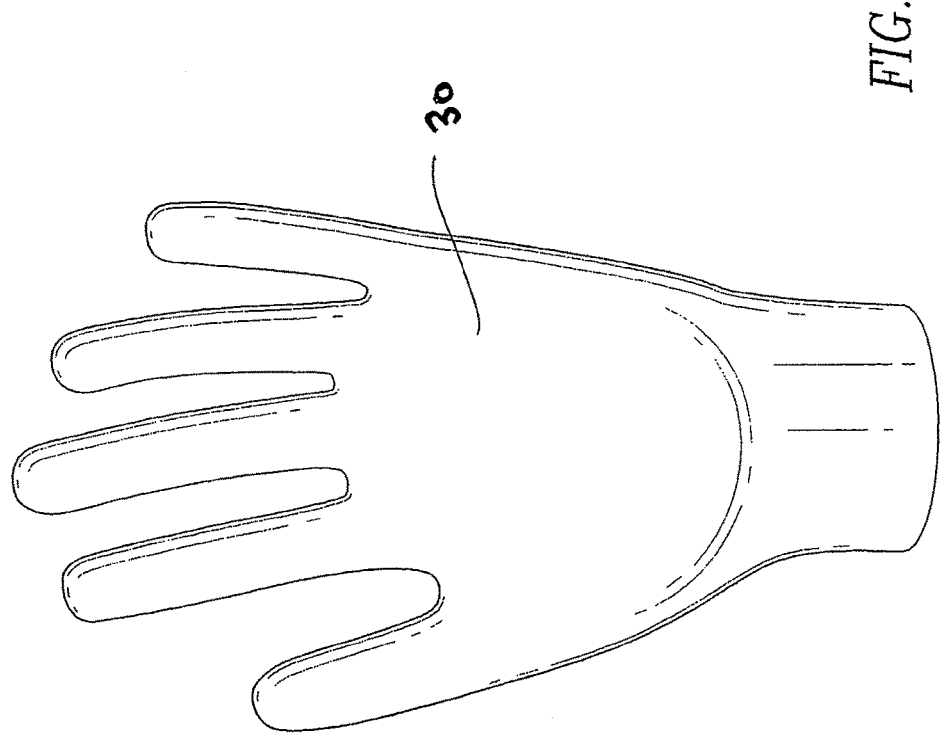
FIG. 11 shows a perspective view of a first mold part in the shape of a hand.

Preferably, a mold that comprises a first mold part in the shape of at least a portion of a hand and at least one corresponding second mold part, and preferably two or more corresponding mold parts, create a mold cavity with the fabric therein. The first mold part 30 in the shape of at least a portion of a hand may be in the three dimensional shape of a hand, as shown in FIG. 11, and is not merely a two dimensional silhouette of a portion of a hand. The heat resistant fabric 12 is preferably in the form of a glove blank, i.e., at least a portion of a glove structure which can receive at least a portion of a hand. Alternatively, albeit less preferred, the heat resistant fabric 12 can be cut in the shape of the outlined elastomeric material that forms the molded portion 4 of the glove 2, as shown in FIGS. 3-4 and/or FIGS. 5 and 8, that is sewn to a fabric material 12, illustrating an alternative embodiment of the molded portion 4.

The utility glove 2 of the present invention, however, is most preferably manufactured by placing a glove blank comprising a fabric material 12 over a first mold part 30 in the form of at least a portion of a hand and bringing at least one second mold part into molding engagement with the first mold part 30 to create a cavity with the glove blank on the first mold part. The elastomeric material is then injected into the cavity to form a three dimensional molded portion 4 comprising the elastomeric material bonded to the fabric 12, wherein the elastomeric material is injected on the side of the fabric material 12 opposite the first mold part 30. Once the molded portion 4 is formed, the second mold part is disengaged from the first mold part 30 and the fully formed utility glove 2 is removed from the first mold part 30.

With respect to the embossed gripping details 6, debossed flex grooves 8, and raised textured grip areas 10, as well as perforations 24, dimples, bumps and the like, it is preferred that the second mold part is adapted to form these elements in the molded portion 4. This formation of elements on the molded portion 4 is well known to those skilled in the art of injection molding, where the features formed within the cavity of the one or more second mold parts create the features on the exterior of the molded portion 4 when the elastomeric material is injected into the cavity.

In one of the most preferred embodiments, shown in FIGS. 9 and 10, where the molded portion 4 extends up to and including 360° about the glove 2 without a seam, a second mold part and a third mold part may be brought into molding engagement with the first mold part to create a mold cavity, with a glove blank in the form of at least a portion of a glove on the first mold part. It is here contemplated that the second mold part is adapted to mold at least a portion of one of the palm side or the back side of the glove 2 and the third mold part is adapted to mold a portion of the other of the palm side or the back side of the glove 2.

The method of injection molding of the elastomeric material in the present invention permits the application of the elastomeric material on both sides of the glove 2, i.e., the palm side and the back side, while selectively leaving areas on the of the glove 2 without an elastomeric material. This ensures breathability of the glove 2, where the open portions without an elastomeric material may have a mesh or other fabric 12 in the opening for user comfort. Preferably, as shown in FIGS. 9 and 10, the elastomeric material of the molded portion 4 continues seamlessly around to the back of the glove 2, and most preferably seamlessly 360° around at least a portion of the glove 2.

For the three dimensional potion of the mold, namely the thumb and index finger in the embodiment of FIGS. 3 and 4 and each of the fingers in the embodiment of FIGS. 5 and 8-10, a stay can be inserted that ensures the molded portion of the fingers, including the index finger and thumb, keep their shape. However, the shaped molded portions of the glove 2, including the fingers and the palm of the molded portion 4 adapted to take a pre-curved concave configuration, are preferably formed by corresponding mold parts, where a first mold part 30 is the three dimensional shape or form of at least part of a hand. When using the preferred corresponding mold parts, the elastomeric material is injected on the side of the fabric 12 opposite the first mold part 12 in the shape of at least a portion of the hand to form the molded part or parts 4 and/or 14 of the glove 2.

In either event, the molded elastomeric material is intended to adhere to all areas of the fabric 12 within the mold, preferably including the cap for covering the entire tip of the thumb and index finger or fingers, as well as the majority of the circumference of the thumb and fingers to be covered, that is at least, and preferably greater than, 50% of the circumference of the user's thumb and fingers, as desired.

Optionally, a thin lining material can be inserted between the fabric and the first mold part or as the fabric prior to shooting the elastomeric material, so that whatever portion that would be in contact with the palm, thumb and fingers of the user would be lined. The glove fabric 12 could then be stitched onto the contour of each finger and reinforcement area of the glove 2, if desired.

If the fabric 12 in the molded palm portion 4 is not in the form of a glove blank which comprises the entire area of the glove 2, the molded portion 4 is then attached to the balance of the glove 2. Preferably, however, the fabric 12 that is visible on the back of the molded fingers, including the back of the thumb and the back of the index finger in FIGS. 1-4 and all fingers in FIGS. 5-8, is not stitched, but is a continuation of the fabric 12 bonded to the elastomeric material in the molding process.

In the embodiment of FIGS. 1-4, 9 and 10, the molded portion 4 is molded about the tip of the thumb and index finger, to form a cap over the tip of the thumb and index finger, and across the palm in the area below the fingers, including up onto a lower portion of the fingers adjacent the fourchettes for the purposes of creating as much of a waterproof construction as possible. The mold would also rise in between the index finger and the thumb, forming a saddle 28 from at least about the base of the thumb to at least about the base of the forefinger and extending from the palm side of the glove 2 to the back side of the glove 2 as part of the molded palm portion 4, for enhanced grip to enable the user to grip trowels, rakes, etc. more effectively. Flex grooves 8 are preferably placed in the areas of at least some of the joints of the hand on the molded palm portion 4, including in the palm area and at the fingers to provide improved flexibility. Raised portions 10, for abrasion resistance or padding, are included at the tips of the thumb and index finger as well as in the area of the saddle 28.

With respect to the elastomeric materials used, different compositions of elastomeric material can be used in the formation of the molded portion(s) 4 and/or 14 or parts thereof. For example, an elastomeric material that is less slippery when wet may be used at the tips of the thumb and one or more fingers, as well as the saddle 28, allowing the glove 2 to be more versatile in wet conditions. Moreover, if abrasion resistance is of particular importance in an area of the molded portion 4, a denser material can be used in that area. Similarly, where impact resistance is of particular importance in an area, such as a padded area 10, a less dense elastomeric material may be preferred. The proper applications of such variations will be well within the design preferences of one skilled in the art.

Notwithstanding, it has been found that thermoplastic vulcanite (TPV) and thermoplastic rubber (TPR) are preferred materials for forming and serving as the elastomeric material used for the molded portion(s) 4 and/or 14 of the glove 2 of the present invention. It has been found that the balance between durability and flexibility of the elastomeric material can be tilted toward flexibility when using the present invention. As such, an elastomeric material with a shore durometer of from about 10 to about 25, and most preferably about 15, can be used at very thin thicknesses when bonded to the fabric in areas where flexibility is more desirable than durability. For durability and/or protection purposes, durometers of up to or over 60 can be used.

In the embodiments shown in FIGS. 5-10, molded portion 4 preferably covers at least, and preferably greater than, 50% of the circumference of the fingers including the entire palm side and the majority of the sides of the fingers. The palm portion 4' of the embodiment shown in FIGS. 9 and 10 is preferably pre-curved in a concave configuration to minimize bunching when the wearer's hand closes, i.e., with the middle of the palm being set in from the front, back and each side of the palm, exclusive of any pre-curved finger portion. The molded portion 4 also preferably contains embossed gripping details 6, such as textured loops, a gnarled surface, dimples bumps and/or the like, to increase gripping and enhance the protection of the user. The back portion of the glove 2 may include a closure element, shown in the form of a stretchable material 18 rather than a wrist strap 16, to provide a snug and comfortable fit while permitting easy insertion and removal of the wearer's hand.

In another embodiment, shown in FIGS. 12-16, the molded back portion 4" on the back of the glove 2 in the area of the knuckles, where the fingers meet the main body of the hand, is preferably pre-curved in a convex configuration. More particularly, the molded portion 4" on back of the glove 2 in the area of the knuckles would form a convex shape when the glove is placed back side up on a flat surface. Preferably, the middle finger knuckle on the back of the hand, or an area associated with or in the general area of the middle finger knuckle on the back of the hand, would be at the highest elevation. In this embodiment, the edges of the back of the hand as well as the fingers and back of hand nearer the wrist would all be lower than the highest elevation at or near the middle knuckle.

This configuration helps to enhance comfort when worn, and particularly as the shore durometer of the material increases to improve protection on the back of the hand. The comfort is enhanced through the use of the convex back of the glove 2, where the convex configuration creates a natural curve to the glove 2 corresponding to a hand is in an at rest position.

Of course, the molded portion 4 of the glove 2 of the present invention is also amenable to molding with any variety of different patterns shapes and designs, including padded or raised portions 10, greater or lesser pre-curving of the palm portion 4' to create a predetermined cupped shape, greater or lesser pre-curving of the molded back portion 4" to create a predetermined convex shape, flex grooves 8 or textured areas 6. The benefits of these features would similarly be the comfort, cosmetic value, waterproofing, which may be important for some uses, as well as providing padding in critical impact areas, and additional grip and or abrasion resistance in critical areas of the glove 2.

The glove 2 of the present invention can be manufactured with different fabric and elastomeric materials, as described above. In addition to the different materials, the glove 2 of the present invention can have different thicknesses, both overall and in different areas of the molded portion.

More particularly, the fabric 12 used to form the glove 2 of the present invention, can have any suitable thickness, but is preferably from about 0.4 to about 1.8 mm thick and most preferably about 0.5 to about 0.8 mm thick. Similarly, the elastomeric material can be molded onto the fabric 12 at any suitable thickness, however, it is preferred that the elastomeric material have a thickness of from about 0.4 to about 10.0 mm. In this regard, the upper limit of the elastomeric material can correspond to the appropriate use, including thicknesses of up to about 4.0, about 5.0, about 6.0 about 7.0 and about 10.0 mm for uses requiring such characteristics as electrical insulation to vibration damping, for use with everything from power drills to jackhammers. As such, the thickness of the molded portion, with the elastomeric material boded to the fabric material, would have a preferred thickness of from about 0.8 to about 10.8 mm.

Notwithstanding, for more common utility uses, it is preferred that the thickness of the elastomeric material in the molded portion 4 be from about 0.5 to about 3.0 mm thick, with from about 0.5 to about 1.7 being most preferred. Using these thicknesses, the overall thickness of the preferred glove 2 in the molded portion 4, including the elastomeric material bonded to the fabric material, is from about 0.8 to about 3.1 mm thick and most preferably from about 1.0 to about 2.3 mm thick.

In the preferred embodiment of FIGS. 9 and 10, the molded pre-curved palm portion 4' continues to the fingers to form an overall cupped shape including the fingers, again to minimize bunching when the hand is closed. Also incorporated in this embodiment are raised portions 10 and flex grooves 8 having stepped thicknesses to maximize flexibility, wear and cushioning. Most preferably, the areas of the embodiment of FIG. 9 forming the molded first areas 20, shown as about and within the palm, between the fingertips and joint between the fingers and the palm, around the back of the glove and in the flex grooves 8, is formed of an elastomeric material that is from about 0.4 to about 1.0 mm, and preferably from about 0.5 to about 0.8 mm Used with a fabric of about 0.5 to about 0.6 mm, the total thickness of the molded palm portion 4 in the molded first areas 20 is preferably from about 1.0 to about 1.6 mm. This provides maximum flexibility for the user in the molded first areas 20.

The molded second areas 22 of the embodiment of FIGS. 9 and 10, being at the fingertips, on the saddle 28, between the forefinger and thumb and/or across the area between the palm and the fingers, comprises an intermediate raised area 10. The molded second areas 22 are formed of an elastomeric material that is from about 1.2 to about 1.6 mm, and preferably about 1.4 mm Used with a fabric of about 0.5 to about 0.6 mm, the total thickness of the molded portion 4 in the molded second areas 22 is preferably from about 1.7 to about 2.2 mm. This provides additional durability for wear and extra protection without sacrificing feel.

The molded third areas 24 of the embodiment of FIGS. 9 and 10, being within the palm and/or across the knuckles on the back of the glove 2, is comprised of an extra raised area 10'. The molded third areas 24 are formed of an elastomeric material that is from about 1.6 to about 2.0 mm, and preferably about 1.8 mm Used with a fabric of about 0.5 to about 0.6 mm, the total thickness of the molded portion 4 in the molded third areas 24 is preferably from about 2.1 to about 2.6 mm. This provides maximum protection for the portions of the users hand most likely to receive traumatic impact.

Significantly, the present invention provides the heretofore unknown benefit of a glove with a molded palm portion 4 that can utilize a molded elastomeric material of down to about a 10 shore durometer at a thickness down to about 0.4 mm, and preferably about 0.5 mm, provided it is backed with a suitable fabric 12 used in the molding process. This advance in the formation and flexibility permits the use as a molded portion 4 of a glove, where the user requires excellent flexibility with good durability.

In contrast, where finger or hand protection is most important, such as at the fingertips or the backs of the knuckles, the use of elastomeric materials with shore durometers of from about 25 to about 60 are preferred. Moreover, in areas where protection is of higher importance, the thickness of the elastomeric material can be increased as an alternative to, or in addition to, the use of materials with higher shore durometers.

Most preferably, the embodiment of FIGS. 9 and 10 provides a glove 2 with an molded portion 4 that seamlessly extends up to and including 360° about the glove 2, preferably having openings to permit airflow and, therefore, breathability to the glove 2. For example, as shown in FIG. 10, the molded portion 4 surrounds open fabric portions 12 on the back of the glove 2 for breathability in the finger area. Such fabric portions without elastomeric material encompassed by molded portion 4 can likewise be incorporated into the palm area of the glove 2, as desired.

Figure 12:
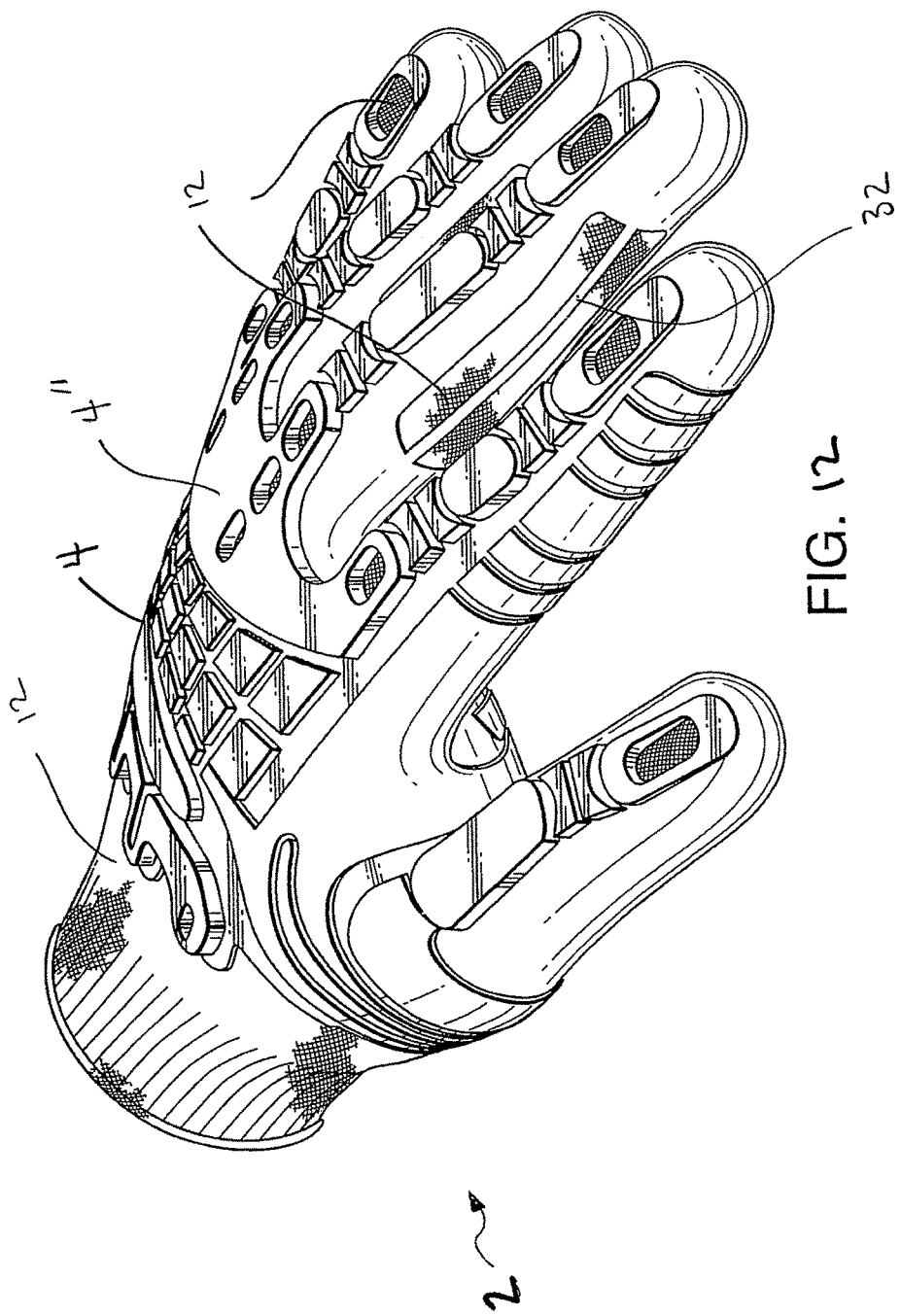
FIG. 12 shows a perspective view of an alternative embodiment of a utility glove according to the invention.
Figure 13:
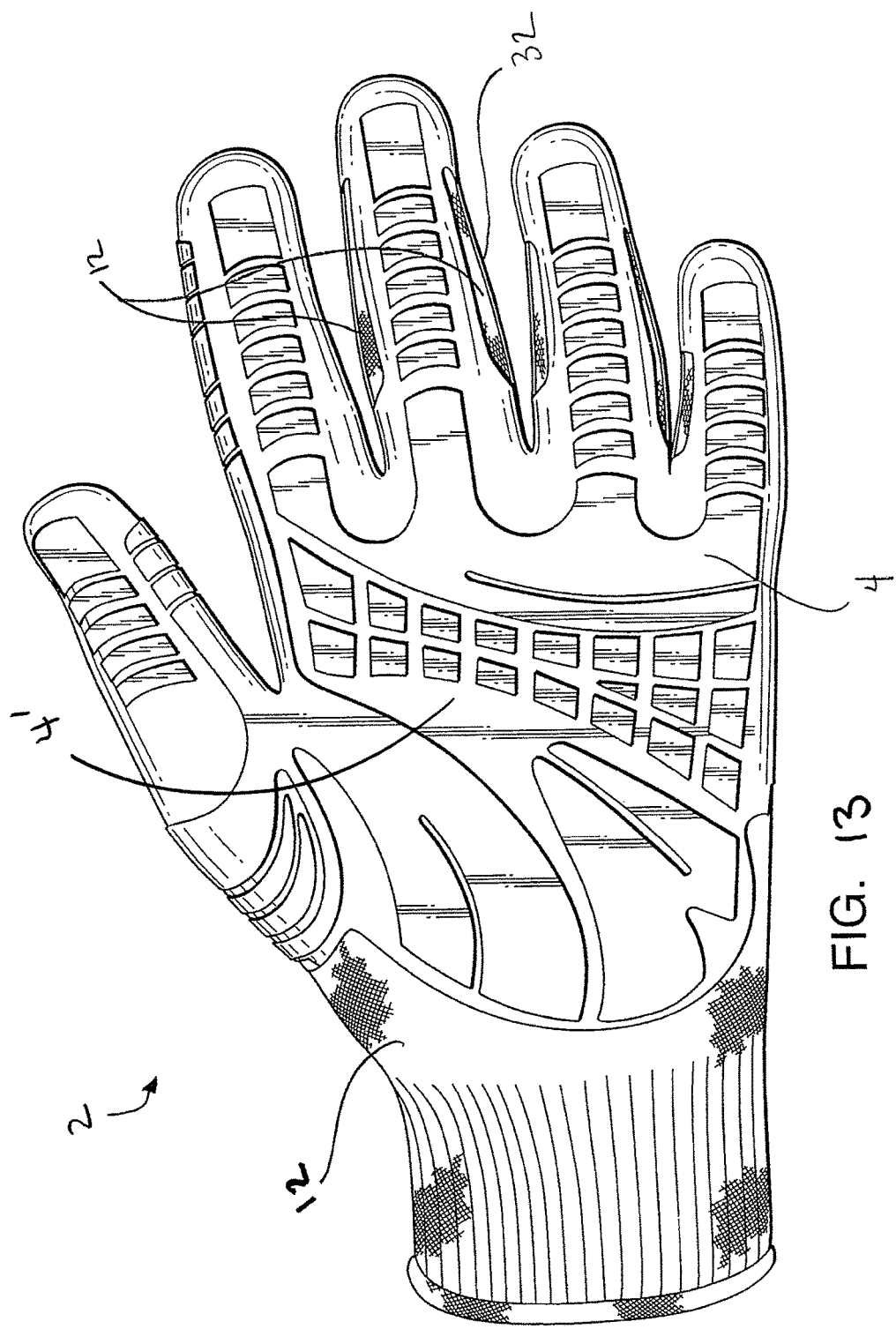
FIG. 13 shows a front elevation of the alternative embodiment of the utility glove of FIG. 12.
Figure 14:
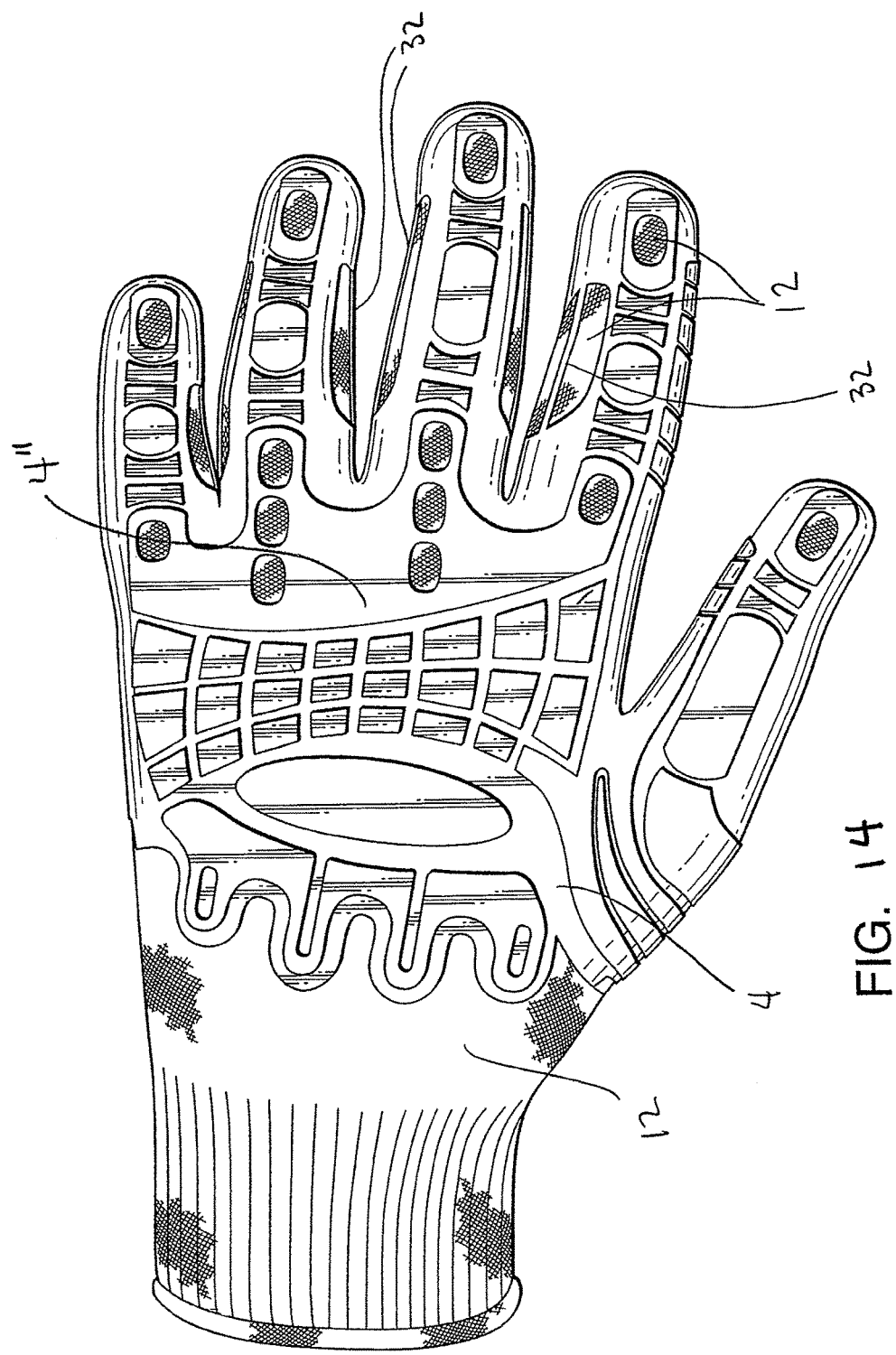
FIG. 14 shows a back elevation of the alternative embodiment of the utility glove of FIG. 12.

Similarly, as shown in FIGS. 12-14, openings can be placed on one or both sides of one or more fingers rather than on the middle of the backs of the fingers, so that the backs of the fingers have protection for the knuckles at the middle and tips of the fingers while providing venting to the finger area. It has been found that including an elastomeric material strip 32 through the openings in the area related the parting line of corresponding second mold parts in this embodiment aids in the formation of the molded portion 4. More specifically, it has been found that the fabric at the parting lines of the corresponding second mold parts can be damaged during closing of the corresponding mold parts about the first mold part 30 if the cavity does not include the area of the parting line.

In contrast, the embodiment shown in FIGS. 15 and 16 illustrate a utility glove 2 without any openings, the molded portion 4 covering virtually the entire area of the hand above the wrist on both the front and back of the glove.

Of course, as described above, the elastomeric material that is used for the molded portion 4 in the various areas 20, 22 and 24 may have different physical characteristics. These include differences in density, tackiness, flexibility, durability, cut or puncture resistance, shore durometer, etc., and can be used in any combination of materials and areas of coverage. Moreover, as the elastomeric materials are injection molded they form a molded portion 4 that is unitary and seamless.

For example, the glove 2 shown in FIGS. 17 and 18 includes a molded portion 4 that comprises a first elastomeric material 34 in the areas of the hands and fingers exclusive of the fingertips, the fingertips being formed of a different, second elastomeric material 36. A preferred combination for use with the glove 2 of FIGS. 17 and 18 is the use of a softer first elastomeric material 34, such as a thermoplastic resin having a shore durometer of about 10-25, in the area below the fingertips with a harder second elastomeric 36, such as a thermoplastic resin having a shore durometer of above 25, and preferably about 60, or a hard nylon, in the fingertips.

This combination of first elastomeric material 34 and second elastomeric material 36 forms a glove 2 with enhanced protection of the fingertips, especially where the fingertip extends 360° about the tip of the finger, creating something of a thimble on one or more of the fingertips. Such a configuration would be useful in applications where cut or puncture resistance, increased durability and/or crush resistance is favored.

Figure 20:
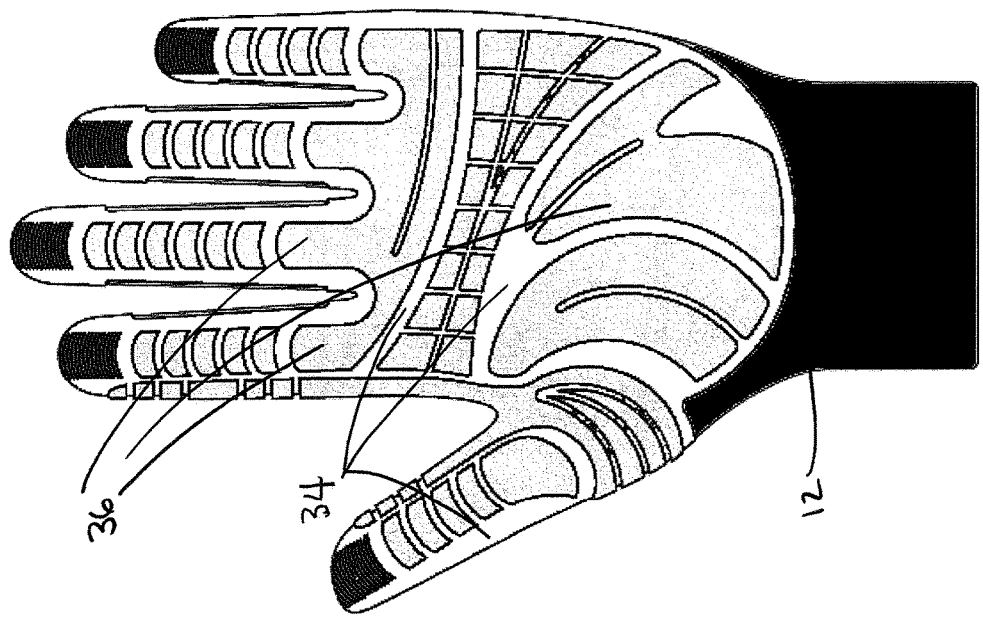
FIG. 20 shows a front elevation of the alternative embodiment of the utility glove of FIG. 19.
Figure 19:
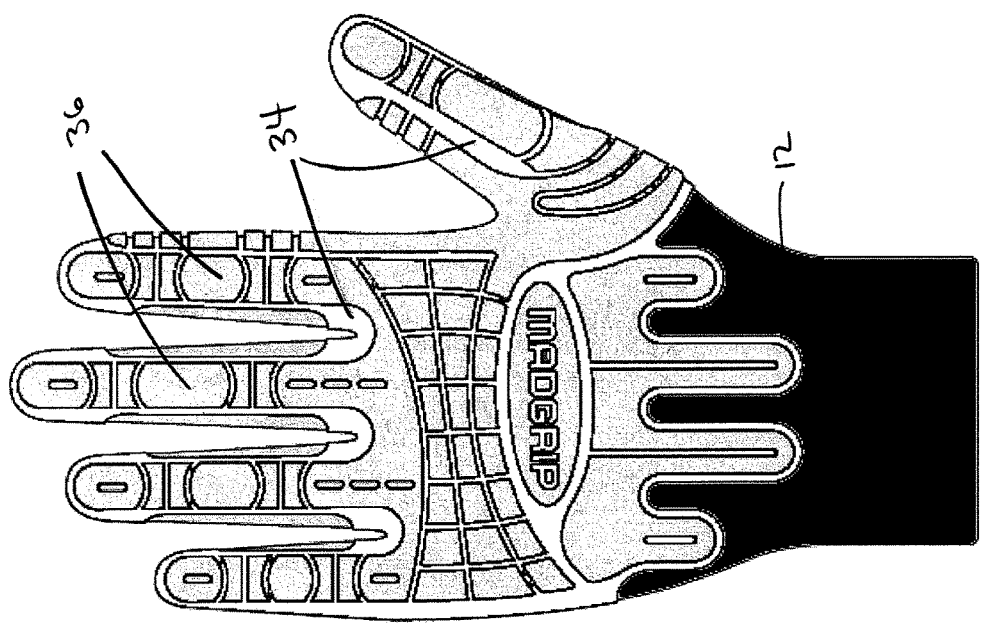
FIG. 19 shows a back elevation of another alternative embodiment of the utility glove using an elastomeric material at flex lines which is different than the elastomeric material used for the remainder of the molded portion.
Figure 22:
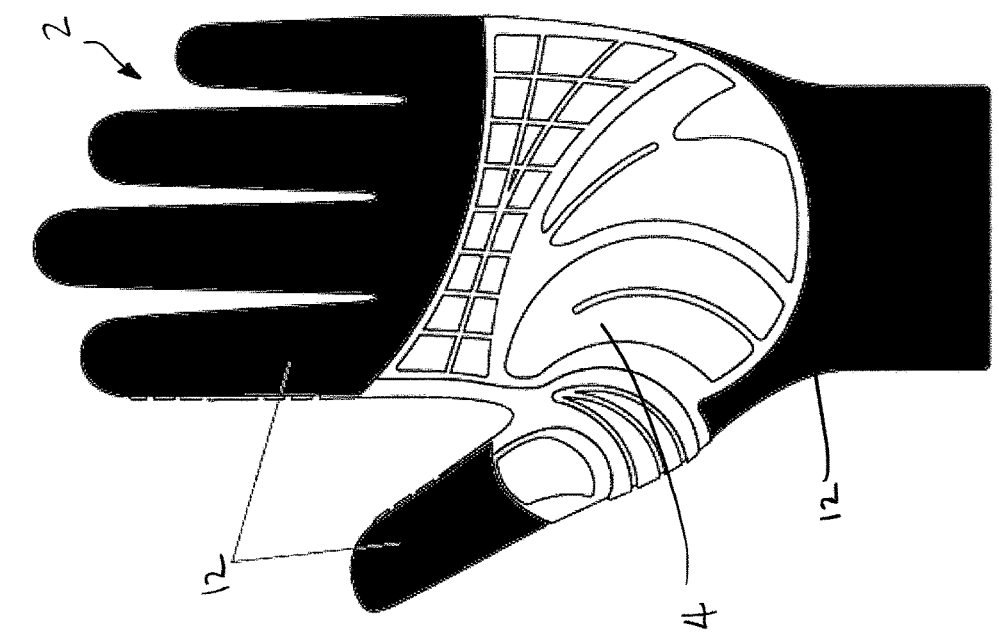
Figure 21:
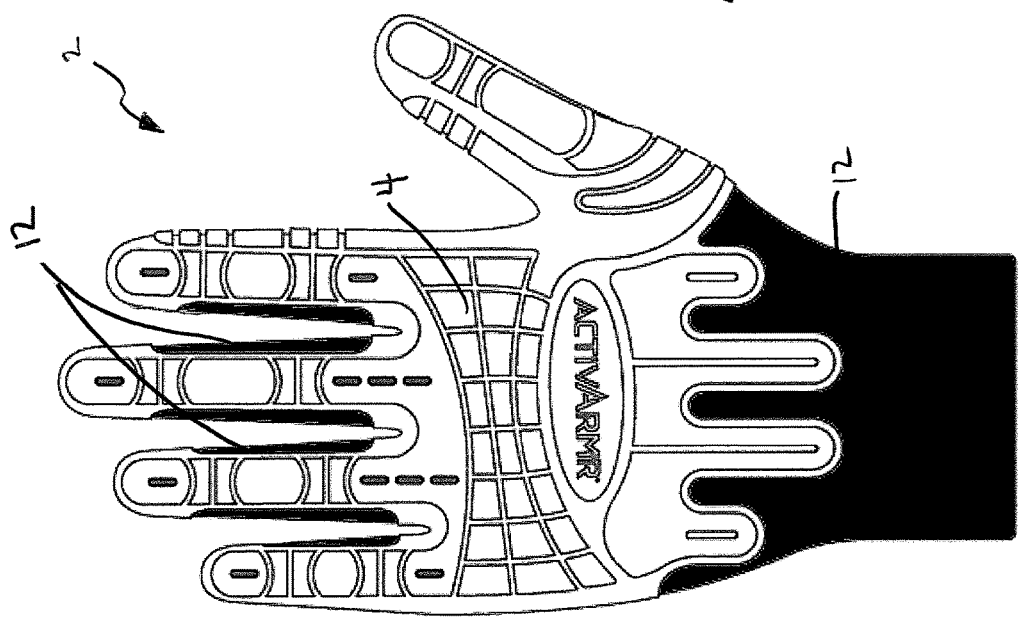
Figure 28:
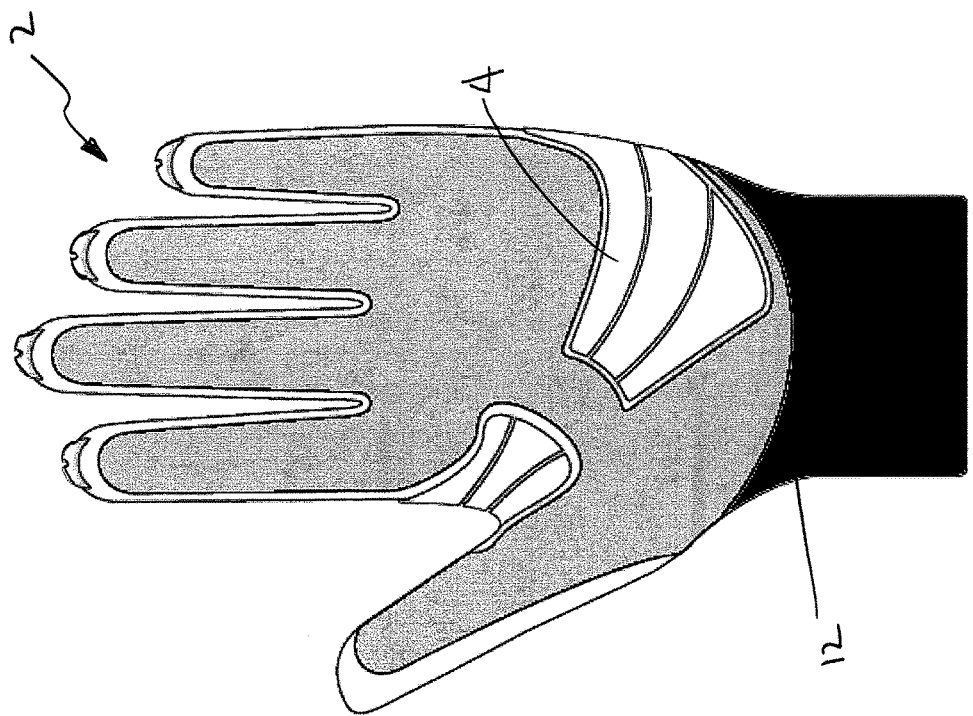
FIG. 28 shows a front elevation of the alternative embodiment of the utility glove of FIG. 27, with the molded portion wrapping onto the glove front.
Figure 27:
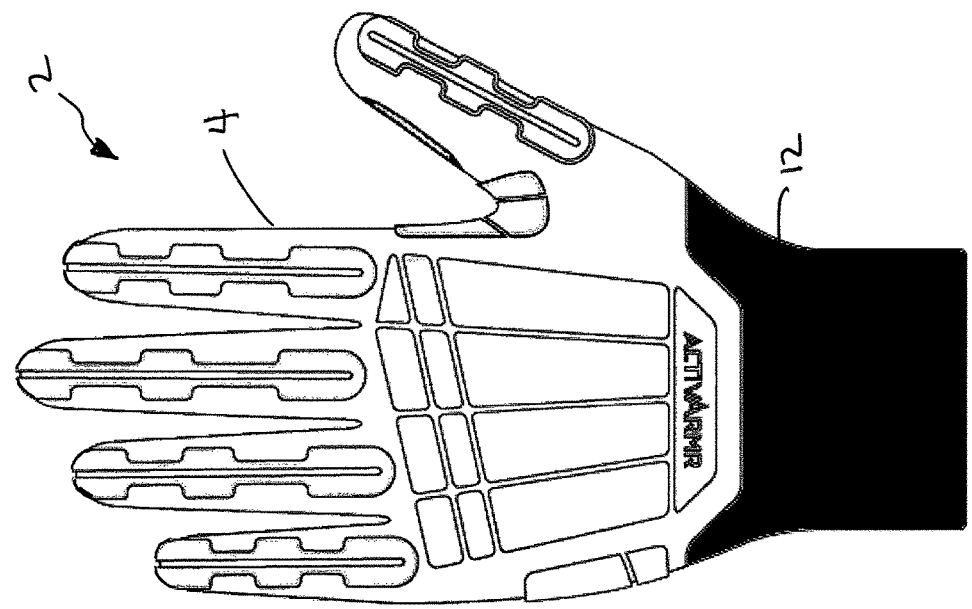
FIG. 27 shows a back elevation of another alternative embodiment of the utility glove where the molded portion selectively covers areas of the glove, here covering the entire back of the glove and leaving areas of the front of the glove open for treatments to the fabric such as an elastomeric material coating.

In an alternative example, the glove of FIGS. 19 and 20 is formed with a molded portion 4 that utilizes a softer first elastomeric material 34 in areas associated with flexibility of the hand with the remaining areas formed of a harder second elastomeric material 36. The harder second material 36 can be used in selected areas of the palm, fingers and back of the hand for durability, puncture resistance and/or impact protection.

As will be appreciated, the combinations of materials and areas of coverage are limitless. In all such embodiments, however, the present invention contemplates the formation as using an injection molding process or processes. In one such process, the first and second, as well as potentially third, fourth, etc., elastomeric materials are injected into different areas of the mold cavity using different injectors for delivery of the particular elastomeric material in a particular area. Alternatively, or in combination, the injection molding of the different areas can be done in a two-step process, where a first set of corresponding second mold parts are used to form specific areas of the molded portion, and a second set of corresponding second mold parts are then used to form other specific areas of the molded portion.

As set out above, it is contemplated that the injection molding of elastomeric material onto fabric to form the molded portion 4 can leave areas of fabric without elastomeric material (see FIGS. 9 and 10). This can be used not only for ventilation, but to allow different coatings to be exposed or added to the glove 2. For example, in cases where the fabric is a coated fabric and the coating material is beneficial to the ultimate use, areas of fabric can be left exposed during the injection molding for forming the molded portions 4.

In the examples of FIGS. 21-30, the molded portion 4 covers different areas of the glove 2, leaving areas of fabric 12 exposed, where the molded portion 4 may be comprised of one elastomeric composition, shown in FIGS. 21-24, or more than one elastomeric composition, shown in FIGS. 25-26. In the preferred embodiments, the molded portion 4 will cover different areas of the glove depending on the use envisioned, with the molded portion 4 preferably being integrally formed across at least portions of the front (palm side) and back (back of hand side) of the glove 2, even when the molded portion 4 is not integrally formed 360° about the glove 2. The exposed fabric 12 can be the knit hydrophilic fabric described above, other fabrics of the same or differing materials, treated fabrics or coated fabrics. Moreover, the glove blank placed on the first mold part 30 prior to injection molding the elastomeric material of the molded portion 4 can be coated only in specific areas prior to placing it on the first mold part 30 or the areas which are to be coated can be coated after the molded portions 4 are formed. (See, for example, FIGS. 23-24 and 27-30.)

More specifically, the gloves having at least an area comprising a treated or coated fabric may be manufactured in different ways, so as to include both an exposed treated/coated portion and a molded portion 4. Such a combination of one or more molded portions and one or more coated portions may be used to create a glove that has a waterproof seal between the molded portion and the coated fabric.

In a first method, a glove blank of a fabric, including any suitable fabric such as fabric formed of one or more materials, treated fabric or coated fabric, is coated by any known process such as dipping in a nitrile, latex, neoprene, PVC, polyurethane or other composition(s). This coating step can be completed after the glove blank is placed on the first mold part 30 or in a separate step prior to placing the glove blank on the first mold part 30, as is well known in the art. Next the glove blank with one or more coated areas is closed within the mold and the elastomeric material(s) is/are injected to form the molded portion 4 over the entire, a portion of or none of the coated area(s) of the fabric. The glove 2 is then removed from the first mold part 30, as a complete glove 2 or for further processing.

Depending on the potential treatment and/or coatings on the glove blank, as well as whether the areas treated and/or coated are to have elastomeric material injection molded over them, an adhesive or other composition may be used to improve the bond between the treated/coated fabric and the elastomeric material introduced by injection molding. In the most preferred embodiment where an adhesive is used, the adhesive can be sprayed, painted or otherwise applied to the areas on which the elastomeric material will be injection molded to form the molded portion 4. The adhesive would cure when the glove blank on the first mold part 30 is placed in the injection molding machine. It has been found that 3M 847 bonding agent can work as a suitable adhesive when molding thermoplastic resin over a nitrile coated glove blank, however, other adhesive agents and/or coatings can be used.

Moreover, the temperature of the elastomeric material being injected onto the fabric can be varied depending on the particular fabric material, including depending on the nature of the coating if the fabric material is a coated fabric. Other variables in determining the temperature of the elastomeric material being injected may be the cycle time and injection pressure, as would be apparent to one skilled in the art.

In an alternative method, the glove 2 may be formed with the molded portions 4 by placing a fabric glove blank on the first mold part 30 and injection molding elastomeric material(s) to form the three dimensional molded portion(s) 4. The glove 2 is then further processed by treating or coating one or more of the fabric areas which do not have elastomeric material. This treatment can be the application of nitrile, latex, neoprene, PVC, polyurethane or other composition(s), by dipping, spraying, painting or any other suitable application. Of course, during this step, the treatment/coating may be included on the elastomeric material as well, if desired or for ease of processing.

Notwithstanding, it is preferred that a coating applied to the glove 2 after injection molding the elastomeric material onto the fabric 12 to create the molded portion 4 coat as little of the elastomeric material of the molded portion 4 as possible. To accomplish this, the coating can be selectively applied to only the desired areas of the fabric 12. This can be done either by precisely applying the coating to the desired areas of the fabric, i.e., by brushing, spraying, dipping or otherwise coating only the areas of fabric and an edge of the elastomeric material, or by covering the portions of the elastomeric material that are not to be coated, i.e., by taping, capping or otherwise, so that only the area to be coated is exposed to the coating material.

In any event, it has been found that if the molded portion 4 covers over about 40% of the circumference of fingers, the thumb and/or the hand portion it should cover greater than 50% of the circumference of the fingers and hand, so that the parting lines of corresponding second mold parts contain cavities for receiving elastomeric material. Alternatively, a material strip 32 can be placed in the area of the parting lines of the corresponding second mold parts to avoid damage to the fabric 12 as the corresponding second mold parts close and to aide in the proper manufacture of the glove 2.

Also as shown in FIGS. 9 and 10, the elastomeric portions of the glove 2 may include perforations 24 that extend thorough the elastomeric material. These perforations 24 not only provide ventilation between the interior and exterior of the glove 2, enhancing user comfort, but may provide a vacuum grip where a vacuum is created between the user's finger sealing off the perforation 24 at the interior of the glove 2 and the article to be held at the exterior of the glove 2.

As further shown in FIGS. 9 and 10, the molded portion 4 of the glove 2 may include gripping details 6 in the form of a gnarled surface, dimples, bumps, "v" shaped members and/or "w" shaped members that displace moisture both horizontally and vertically to create improved grip in wet or slippery conditions. As shown in the drawings, but without limitation, the gripping details 6 may have dimples or perforations 24 thereon to further increase grip by the use of a vacuum effect, as described above.

For example, the glove 2 of the present invention preferably includes a molded portion 4 with raised textured grip areas 10 at the fingertips and thumb tip for use in gloves for sports and athletics. The raised areas 10 create additional grip and resistance to catch a ball and/or hold a racket, bat, rope, paddle, etc. Most preferably, the textured surface on the raised textured grip areas 10 of the fingertips and thumb tip further improve the grip and resistance.

Moreover, as will be apparent to those skilled in the art, the glove 2 of the present invention can be designed with different combinations of the components described above. For example, the glove 2 of FIGS. 1-2 could be fashioned with a stretchable material 18 rather than a wrist strap 16, or could include a molded portion 4 that covers the front and sides of all of the fingers. Similarly, although the illustrated embodiments include a molded portion 4 over only the index finger and thumb or all fingers and thumb, it is understood that any number or combination of thumb and fingers can be covered.

It will thus be seen that the objects set forth above, those made apparent from the preceding description, and certain changes in the above constructions may be made without departing from the spirit and scope of the invention, such that all matter contained in the above description or shown in the accompanying drawings shall be interpreted as illustrative, and not limiting. In this regard, and without limitation, the various features shown in the several embodiments described can be applied singularly or in any number of combinations without falling beyond the scope of the invention.

It is also to be understood that the following claims are intended to cover all of the generic and specific features of the invention herein described, and all statements of the scope of the invention which, as a matter of language, might be said to fall therebetween.

The invention claimed is:

1. A method of manufacturing a utility glove comprising the steps of:

a. placing a glove blank comprising a fabric material over a first mold part in the form of at least a portion of a hand, said glove blank including a main body portion and at least one of a thumb and/or at least one finger;

b. bringing at least one second mold part into molding relationship with the first mold part to create a cavity with the glove blank on the first mold part, said cavity corresponding to a three dimensional portion of the glove blank on the first mold part conforming to a three dimensional contour of a hand on at least one of the main body portion and at least one of the thumb and/or at least one finger but not the entire glove blank, and further wherein the cavity corresponds to over 50% of a circumference of the at least one of the thumb and/or at least one finger but not 100% of the entire length of the thumb and/or at least one finger, leaving at least an area of fabric on at least one of the thumb and/or at least one finger not corresponding to the cavity on which the at least one second mold part rests; and c. injecting an elastomeric material into the cavity onto the fabric of the glove blank to form a three dimensional molded portion conforming to the three dimensional contour of a hand.

2. The method of manufacture of claim 1 wherein the elastomeric material comprises more than one elastomeric material composition with different elastomeric material compositions being injected into different areas of the cavity to form a three dimensional molded portion with different areas having different characteristics.

3. The method of manufacture of claim 1 wherein the glove blank comprises a main body portion, a thumb and at least one finger.

4. The method of manufacture of claim 1 wherein the glove blank comprises a main body portion, a thumb and four fingers.

5. The method of manufacture of claim 4 wherein the cavity corresponds to over 50% of a circumference of each of the thumb and four fingers but not 100% of the entire length of the thumb and/or at least one finger.

6. The method of manufacture of claim 1 wherein the cavity created by the first and second mold parts entirely surrounds a portion of the second mold part that contacts the fabric on the first mold part when the second mold part is in molding relationship with the first mold part, to create an area of fabric without elastomeric material that is entirely surrounded by the molded portion.

7. The method of manufacture of claim 1 further comprising the step of removing a fully formed utility glove from the first mold part.

8. The method of manufacture of claim 1 wherein the main body of the glove blank further comprises a terminal edge and the cavity formed by the second mold part does not extend to the terminal edge of the glove blank, thereby maintaining an area of fabric without elastomeric material about the main body portion adjacent the terminal edge of the glove blank.

9. The method of manufacture of claim 1 wherein the cavity with the glove blank on the first mold part has adjacent areas with different thicknesses to form features on the surface of the molded portion.

10. A method of manufacturing a utility glove comprising the steps of:

a. placing a glove blank comprising a fabric material over a first mold part in the form of a hand, said glove blank including a thumb, four fingers and a main body portion having a terminal edge;

b. bringing at least one second mold part into molding relationship with the first mold part to create a cavity with the fabric of the glove blank on the first mold part, said cavity corresponding to a three dimensional portion of the glove blank on the first mold part but not corresponding to the entire glove blank, wherein the cavity corresponds to over 50% of a circumference of at least one of the thumb and/or at least one finger but not 100% of the entire length of the thumb and/or at least one finger, including that the cavity does not correspond to the fabric at the terminal edge of the glove blank on which the second mold part rests, thereby maintaining an area of fabric without elastomeric material about the main body portion at the terminal edge of the glove blank;

c. injecting an elastomeric material into the cavity to form one or more three dimensional molded portions; and d. removing the second mold part from said molding relationship with the first mold part.

11. The method of manufacture of claim 10 wherein the elastomeric material comprises more than one elastomeric material composition with different elastomeric material compositions being injected onto different areas of the fabric.

12. The method of manufacture of claim 10 wherein the cavity created by the fabric of the glove blank on the first mold part and the second mold part corresponds to an area on the thumb and on each of the four fingers of said glove blank.

13. The method of manufacture of claim 10 wherein the cavity created by the fabric of the glove blank on the first mold part and the second mold part does not correspond to at least an area of fabric on at least one of the thumb and/or at least one finger of the glove blank, on which the at least one second mold part rests.

14. The method of manufacture of claim 10 wherein the cavity created by the fabric of the glove blank on the first mold part and the second mold part entirely surrounds a portion of the second mold part that contacts the fabric on the first mold part when the second mold part is in molding relationship with the first mold part, to create an area of fabric without elastomeric material that is entirely surrounded by the molded portion.

15. The method of manufacture of claim 10 further comprising the step of removing the fully formed utility glove from the first mold part.

16. The method of manufacture of claim 10 wherein the main body of the glove blank further comprises a terminal edge where the cavity formed by the second mold part does not extend to the terminal edge of the glove blank, thereby maintaining an area of fabric without elastomeric material about the main body portion adjacent the terminal edge of the glove blank.

17. The method of manufacture of claim 10 wherein the cavity corresponds to over 50% of a circumference of each of the thumb and four fingers but not 100% of the entire length of the thumb and/or at least one finger.

18. The method of manufacture of claim 10 wherein the cavity with the glove blank on the first mold part has adjacent areas with different thicknesses to form features on the surface of the molded portion.

* * * * *